US012763889B2

(12) United States Patent
Muruganathan et al.

(10) Patent No.: US 12,763,889 B2
(45) Date of Patent: Oct. 13, 2026

(54) DCI-BASED TCI STATE UPDATE WITH FLEXIBLE CHANNEL SELECTION

(71) Applicant: Telefonaktiebolaget LM Ericsson (publ), Stockholm (SE)

(72) Inventors: Siva Muruganathan, Stittsville (CA); Jianwei Zhang, Solna (SE); Andreas Nilsson, Gothenburg (SE); Shiwei Gao, Nepean (CA); Helka-Liina Määttänen, Espoo (FI); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 761 days.

(21) Appl. No.: 18/032,435

(22) PCT Filed: Oct. 18, 2021

(86) PCT No.: PCT/EP2021/078746
§ 371 (c)(1),
(2) Date: Apr. 18, 2023

(87) PCT Pub. No.: WO2022/084215
PCT Pub. Date: Apr. 28, 2022

(65) Prior Publication Data

US 2023/0396375 A1 Dec. 7, 2023

Related U.S. Application Data

(60) Provisional application No. 63/094,611, filed on Oct. 21, 2020.

(51) Int. Cl.
*H04L 5/00* (2006.01)
*H04B 7/06* (2006.01)

(52) U.S. Cl.
CPC ....... *H04L 5/0023* (2013.01); *H04B 7/06968* (2023.05); *H04L 5/0044* (2013.01); *H04L 5/0091* (2013.01)

(58) Field of Classification Search
CPC ... H04L 5/0023; H04L 5/0044; H04L 5/0091; H04L 5/0048; H04L 5/0053; H04B 7/06968
See application file for complete search history.

(56) References Cited

U.S. PATENT DOCUMENTS 11,425,743 B2 * 8/2022 Liou ........................ H04L 5/001
11,503,585 B2 * 11/2022 Zhang ................. H04L 41/0803
(Continued)

FOREIGN PATENT DOCUMENTS

BR 112023002236 B1 * 9/2025
CN 110474668 B * 3/2021 ......... H04B 7/06964
(Continued)

OTHER PUBLICATIONS

3GPP (ZTE: "Preliminary views on further enhancement for NR MIMO", 3GPP Draft; R1-2003483, May 16, 2020 (May 16, 2020), copy provided in the record by applicant Apr. 18, 2023; hereinafter 3GPP483). (Year: 2020).*
(Continued)

*Primary Examiner* — Michael A Keller
(74) *Attorney, Agent, or Firm* — Withrow & Terranova, PLLC

(57) ABSTRACT

Method and apparatus are disclosed herein for providing Downlink Control Information (DCI)-based Transmission Configuration Indicator (TCI) state update with flexible channel selection. In one embodiment, a method performed by a network node of a cellular communication system comprises transmitting, to a User Equipment (UE), a DCI having a DCI format comprising a TCI state update indication, and a TCI state update application indication indicating one or more channels or signals to which the TCI state update is to be applied by the UE. In another embodiment, a method performed by a UE comprises receiving a DCI having a DCI format comprising a TCI state update indica-
(Continued)

tion and a TCI state update application indication indicating one or more channels or signals to which the TCI state update is to be applied by the UE, and applying the TCI state update as indicated by the TCI state update application indication.

5 Claims, 17 Drawing Sheets

(56) References Cited

U.S. PATENT DOCUMENTS

| | | | | |
|---|---|---|---|---|
| 11,665,696 | B2 * | 5/2023 | Zhou | H04L 5/0053 370/329 |
| 11,671,148 | B2 * | 6/2023 | Jung | H04B 7/024 375/267 |
| 12,063,174 | B2 * | 8/2024 | Kim | H04B 7/0408 |
| 12,160,833 | B2 * | 12/2024 | Matsumura | H04W 52/242 |
| 12,256,238 | B2 * | 3/2025 | Ji | H04W 72/21 |
| 12,267,168 | B2 * | 4/2025 | Gao | H04W 56/0045 |
| 12,309,763 | B2 * | 5/2025 | Chung | H04B 7/0695 |
| 12,432,736 | B2 * | 9/2025 | Yokomakura | H04L 5/0053 |
| 12,476,690 | B2 * | 11/2025 | Matsumura | H04B 7/06968 |
| 12,556,334 | B2 * | 2/2026 | Matsumura | H04B 7/06968 |
| 12,568,490 | B2 * | 3/2026 | Matsumura | H04W 16/28 |
| 2019/0222289 | A1 * | 7/2019 | John Wilson | H04L 5/0073 |
| 2019/0297603 | A1 * | 9/2019 | Guo | H04L 5/0051 |
| 2020/0044797 | A1 * | 2/2020 | Guo | H04W 72/51 |
| 2020/0137588 | A1 * | 4/2020 | Zhang | H04B 7/0695 |
| 2020/0267571 | A1 * | 8/2020 | Park | H04B 7/06968 |
| 2021/0029707 | A1 * | 1/2021 | Xu | H04L 5/0051 |
| 2021/0105120 | A1 * | 4/2021 | Khoshnevisan | H04L 5/0091 |
| 2021/0235455 | A1 * | 7/2021 | Khoshnevisan | H04W 80/02 |
| 2021/0274503 | A1 * | 9/2021 | Farag | H04L 1/0061 |
| 2021/0314045 | A1 * | 10/2021 | Cha | H04L 5/0051 |
| 2021/0360667 | A1 * | 11/2021 | Moon | H04L 5/0035 |
| 2021/0378004 | A1 * | 12/2021 | Cirik | H04L 5/005 |
| 2021/0409098 | A1 * | 12/2021 | Matsumura | H04B 7/0834 |
| 2022/0045893 | A1 * | 2/2022 | Yamada | H04L 27/2613 |
| 2022/0116971 | A1 * | 4/2022 | Saber | H04L 5/0055 |
| 2022/0131668 | A1 * | 4/2022 | Matsumura | H04L 5/0042 |
| 2022/0132534 | A1 * | 4/2022 | Jang | H04L 1/08 |
| 2022/0217694 | A1 * | 7/2022 | Kim | H04L 1/1864 |
| 2022/0231808 | A1 * | 7/2022 | Oh | H04L 5/0048 |
| 2022/0303093 | A1 * | 9/2022 | Abebe | H04W 52/325 |
| 2022/0303788 | A1 * | 9/2022 | Zhang | H04B 7/0404 |
| 2022/0312466 | A1 * | 9/2022 | Matsumura | H04L 5/005 |
| 2022/0322399 | A1 * | 10/2022 | Kim | H04W 72/1273 |
| 2022/0393827 | A1 * | 12/2022 | Chen | H04W 52/08 |
| 2022/0400041 | A1 * | 12/2022 | Ling | H04L 27/2613 |
| 2022/0416977 | A1 * | 12/2022 | Farag | H04W 52/42 |
| 2023/0023600 | A1 * | 1/2023 | Cirik | H04L 5/0005 |
| 2023/0023982 | A1 * | 1/2023 | Kim | H04B 7/024 |
| 2023/0044148 | A1 * | 2/2023 | Kang | H04L 1/1864 |
| 2023/0047929 | A1 * | 2/2023 | Matsumura | H04L 5/0085 |
| 2023/0073095 | A1 * | 3/2023 | Kim | H04W 72/1273 |
| 2023/0125906 | A1 * | 4/2023 | Matsumura | H04B 7/024 455/500 |
| 2023/0198601 | A1 * | 6/2023 | Kang | H04L 5/005 370/329 |
| 2023/0254716 | A1 * | 8/2023 | Khoshnevisan | H04W 16/28 370/329 |
| 2023/0261828 | A1 * | 8/2023 | Ji | H04B 17/104 370/329 |
| 2023/0262696 | A1 * | 8/2023 | Chen | H04W 72/1268 370/329 |
| 2023/0309079 | A1 * | 9/2023 | Xu | H04B 7/0695 |
| 2023/0319833 | A1 * | 10/2023 | Khoshnevisan | H04W 72/23 370/329 |
| 2023/0336306 | A1 * | 10/2023 | Park | H04L 5/0094 |
| 2024/0121850 | A1 * | 4/2024 | Matsumura | H04B 7/06968 |
| 2024/0275467 | A1 * | 8/2024 | Jang | H04B 7/06968 |
| 2024/0322894 | A1 * | 9/2024 | Yuan | H04B 7/088 |
| 2024/0340131 | A1 * | 10/2024 | Karjalainen | H04L 5/0073 |
| 2025/0039858 | A1 * | 1/2025 | Zhang | H04W 72/046 |
| 2025/0048389 | A1 * | 2/2025 | Rudolf | H04L 5/0048 |
| 2025/0056533 | A1 * | 2/2025 | Jang | H04W 72/0446 |
| 2025/0202654 | A1 * | 6/2025 | Jang | H04B 7/063 |
| 2025/0324415 | A1 * | 10/2025 | Grossmann | H04L 5/0048 |
| 2025/0373389 | A1 * | 12/2025 | Li | H04L 5/0048 |
| 2026/0012813 | A1 * | 1/2026 | Prasad | H04W 16/28 |
| 2026/0025767 | A1 * | 1/2026 | Leng | H04W 52/242 |

FOREIGN PATENT DOCUMENTS

| | | | | | |
|---|---|---|---|---|---|
| CN | 112771808 | A | * | 5/2021 | H04W 72/23 |
| CN | 112970283 | A | * | 6/2021 | H04W 72/23 |
| CN | 113169780 | A | * | 7/2021 | H04B 7/06952 |
| CN | 113994753 | A | * | 1/2022 | H04W 72/23 |
| CN | 114009135 | A | * | 2/2022 | H04L 5/0051 |
| CN | 114390545 | A | * | 4/2022 | H04W 76/27 |
| CN | 114467351 | A | * | 5/2022 | H04W 72/53 |
| CN | 114631346 | A | * | 6/2022 | H04W 72/23 |
| CN | 114946150 | A | * | 8/2022 | H04L 5/0091 |
| CN | 115004747 | A | * | 9/2022 | H04B 7/0404 |
| CN | 115053590 | A | * | 9/2022 | H04W 72/23 |
| CN | 115606298 | A | * | 1/2023 | H04L 5/0023 |
| CN | 115967598 | A | * | 4/2023 | H04W 24/10 |
| CN | 118020365 | A | * | 5/2024 | H04W 72/1268 |
| CN | 118056369 | A | * | 5/2024 | H04W 72/1273 |
| CN | 118251866 | A | * | 6/2024 | H04L 5/0094 |
| CN | 114946228 | B | * | 9/2024 | H04L 5/006 |
| CN | 119096661 | A | * | 12/2024 | H04L 5/0094 |
| CN | 119678411 | A | * | 3/2025 | H04W 72/232 |
| CN | 115553030 | B | * | 7/2025 | H04W 72/1268 |
| EP | 3952554 | A1 | * | 2/2022 | H04W 72/23 |
| EP | 4123919 | A1 | * | 1/2023 | H04W 72/232 |
| EP | 4135250 | A1 | * | 2/2023 | H04W 72/23 |
| EP | 4216476 | A1 | * | 7/2023 | H04W 24/10 |
| EP | 4243505 | A2 | * | 9/2023 | H04W 74/0833 |
| EP | 4304278 | A1 | * | 1/2024 | H04L 5/0053 |
| EP | 4366221 | A1 | * | 5/2024 | H04W 72/51 |
| EP | 4429155 | A1 | * | 9/2024 | H04W 72/23 |
| EP | 4447368 | A1 | * | 10/2024 | H04L 5/0094 |
| EP | 4478643 | A1 | * | 12/2024 | H04L 5/0048 |
| EP | 4568398 | A1 | * | 6/2025 | H04W 52/247 |
| EP | 4593445 | A1 | * | 7/2025 | H04L 5/0092 |
| EP | 4593497 | A1 | * | 7/2025 | H04L 5/0094 |
| EP | 4615110 | A1 | * | 9/2025 | H04L 5/0048 |
| ES | 2905205 | T3 | * | 4/2022 | H04W 72/11 |
| GB | 2629295 | A | * | 10/2024 | H04B 7/0695 |
| JP | 2022061551 | A | * | 4/2022 | |
| JP | WO2021075338 | A5 | * | 9/2022 | |
| JP | WO2021192298 | A5 | * | 4/2023 | |
| JP | 7346748 | B2 | * | 9/2023 | H04W 72/1273 |
| JP | 7460640 | B2 | * | 4/2024 | H04W 72/23 |
| JP | 7632569 | B2 | * | 2/2025 | H04W 72/23 |
| JP | 7698033 | B2 | * | 6/2025 | H04W 16/28 |
| JP | 7729675 | B2 | * | 8/2025 | H04W 56/0045 |
| KR | 20210020840 | A | * | 2/2021 | H04W 72/23 |
| KR | 20210128403 | A | * | 10/2021 | H04W 8/22 |
| KR | 20210139153 | A | * | 11/2021 | H04B 17/382 |
| KR | 20220053449 | A | * | 4/2022 | H04L 1/189 |
| KR | 20220126012 | A | * | 9/2022 | H04W 72/23 |
| KR | 20220156798 | A | * | 11/2022 | H04W 72/232 |
| KR | 20230049389 | A | * | 4/2023 | H04L 5/0048 |
| KR | 20230088524 | A | * | 6/2023 | H04L 5/0094 |
| KR | 20230105978 | A | * | 7/2023 | H04W 72/232 |
| KR | 20230159832 | A | * | 11/2023 | H04W 72/21 |
| KR | 20240003894 | A | * | 1/2024 | H04B 7/0639 |
| KR | 20240022297 | A | * | 2/2024 | H04L 5/0094 |
| KR | 20240121475 | A | * | 8/2024 | H04L 5/0051 |
| KR | 20240127308 | A | * | 8/2024 | H04W 72/046 |
| KR | 20250020290 | A | * | 2/2025 | H04L 5/0048 |
| KR | 20250077347 | A | * | 5/2025 | H04B 7/0602 |
| KR | 102837437 | B1 | * | 7/2025 | H04W 72/23 |
| KR | 20250146580 | A | * | 10/2025 | H04W 72/232 |
| KR | 102916412 | B1 | * | 1/2026 | H04W 72/20 |
| RU | 2805990 | C1 | * | 10/2023 | |
| TW | 202429940 | A | * | 7/2024 | H04L 5/0094 |
| TW | 202510623 | A | * | 3/2025 | H04W 56/001 |
| WO | 2019097478 | A1 | | 5/2019 | |
| WO | WO-2020031334 | A1 | * | 2/2020 | H04W 16/28 |

(56) References Cited

FOREIGN PATENT DOCUMENTS

| | | | | | |
|---|---|---|---|---|---|
| WO | WO-2020090059 | A1 * | 5/2020 | ............ | H04W 72/23 |
| WO | WO-2020141484 | A1 * | 7/2020 | ............ | H04W 72/20 |
| WO | WO-2020144773 | A1 * | 7/2020 | ............ | H04W 52/48 |
| WO | WO-2020144774 | A1 * | 7/2020 | ............ | H04W 72/23 |
| WO | WO-2020204347 | A1 * | 10/2020 | ............. | H04B 7/024 |
| WO | WO-2020209341 | A1 * | 10/2020 | ............ | H04W 72/23 |
| WO | WO-2020255416 | A1 * | 12/2020 | ............ | H04W 72/23 |
| WO | WO-2021029747 | A1 * | 2/2021 | .......... | H04W 72/542 |
| WO | WO-2021064926 | A1 * | 4/2021 | ............ | H04W 72/23 |
| WO | WO-2021066622 | A1 * | 4/2021 | ............ | H04W 72/23 |
| WO | WO-2021066630 | A1 * | 4/2021 | ............ | H04W 72/23 |
| WO | WO-2021095104 | A1 * | 5/2021 | ........... | H04L 5/0051 |
| WO | WO-2021101538 | A1 * | 5/2021 | ......... | H04B 7/06952 |
| WO | WO-2021118307 | A1 * | 6/2021 | ............ | H04W 72/51 |
| WO | WO-2021119648 | A1 * | 6/2021 | ............ | H04W 72/23 |
| WO | WO-2021126401 | A1 * | 6/2021 | ............ | H04W 72/23 |
| WO | WO-2021133575 | A1 * | 7/2021 | ............ | H04W 72/21 |
| WO | WO-2021146000 | A1 * | 7/2021 | ............ | H04W 72/23 |
| WO | WO-2021149263 | A1 * | 7/2021 | ........... | H04L 27/261 |
| WO | WO-2021181666 | A1 * | 9/2021 | .......... | H04W 72/232 |
| WO | WO-2021201533 | A1 * | 10/2021 | ........... | H04L 5/0055 |
| WO | WO-2021201623 | A1 * | 10/2021 | .......... | H04W 72/232 |
| WO | WO-2021210109 | A1 * | 10/2021 | ......... | H04B 7/06968 |
| WO | WO-2021224965 | A1 * | 11/2021 | ............ | H04W 16/28 |
| WO | WO-2022015061 | A1 * | 1/2022 | ........ | H04W 72/1273 |
| WO | 2022029747 | A1 | 2/2022 | | |
| WO | WO-2022029711 | A1 * | 2/2022 | ......... | H04B 7/06952 |
| WO | WO-2022029723 | A1 * | 2/2022 | ........... | H04L 5/0035 |
| WO | WO-2022029934 | A1 * | 2/2022 | ............ | H04W 72/12 |
| WO | WO-2022032158 | A1 * | 2/2022 | ........... | H04L 5/0048 |
| WO | WO-2022044288 | A1 * | 3/2022 | ........... | H04L 5/0053 |
| WO | WO-2022052044 | A1 * | 3/2022 | ........... | H04B 7/0639 |
| WO | WO-2022082373 | A1 * | 4/2022 | ........... | H04L 5/0094 |
| WO | WO-2022104343 | A1 * | 5/2022 | ............ | H04W 72/20 |
| WO | WO-2022115872 | A2 * | 6/2022 | ............ | H04W 72/51 |
| WO | WO-2022154647 | A1 * | 7/2022 | ........... | H04B 7/0456 |
| WO | WO-2022169272 | A1 * | 8/2022 | ................ | H04L 1/08 |
| WO | WO-2023163552 | A1 * | 8/2023 | ............ | H04W 72/21 |
| WO | WO-2024035197 | A1 * | 2/2024 | ........ | H04W 72/0446 |
| WO | WO-2024147657 | A1 * | 7/2024 | ........... | H04B 7/0874 |
| WO | WO-2024162752 | A1 * | 8/2024 | ........... | H04L 5/0094 |
| WO | WO-2024162804 | A1 * | 8/2024 | ............. | H04L 5/001 |
| WO | WO-2024172573 | A1 * | 8/2024 | .......... | H04W 72/046 |
| WO | WO-2024173116 | A1 * | 8/2024 | ........... | H04L 5/0048 |
| WO | WO-2025005720 | A1 * | 1/2025 | ........... | H04L 5/0048 |
| WO | WO-2025122891 | A2 * | 6/2025 | ........... | H04B 7/0695 |
| WO | WO-2026034622 | A1 * | 2/2026 | ............ | H04W 72/23 |
| WO | WO-2026035044 | A1 * | 2/2026 | ........... | H04B 17/336 |

OTHER PUBLICATIONS

Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.

Author Unkown, "Technical Specification Group Radio Access Network; NR; Medium Access Control (MAC) protocol specification (Release 16)," Technical Specification 38.321, Version 16.2.0, Sep. 2020, 3GPP Organizational Partners, 154 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

ZTE, "R1-2003483: Preliminary views on further enhancement for NR MIMO," 3GPP TSG RAN WG1 Meeting #101-e, May 25-Jun. 5, 2020, Electronic Meeting, 18 pages.

International Search Report and Written Opinion for International Patent Application No. PCT/EP2021/078746, mailed Feb. 1, 2022, 11 pages.

* cited by examiner

PUCCH-SpatialRelationInfo INFORMATION ELEMENT

```
-- ASN1START
-- TAG-PUCCH-SPATIALRELATIONINFO-START

PUCCH-SpatialRelationInfo ::= SEQUENCE {
   pucch-SpatialRelationInfoId     PUCCH-SpatialRelationInfoId,
   servingCellId                   ServCellIndex OPTIONAL, -- Need S
   referenceSignal                 CHOICE {
      ssb-Index                       SSB-Index,
      csi-RS-Index                    NZP-CSI-RS-ResourceId,
      srs                             PUCCH-SRS
},
   pucch-PathlossReferenceRS-Id    PUCCH-PathlossReferenceRS-Id,
   p0-PUCCH-Id                     P0-PUCCH-Id,
   closedLoopIndex                 ENUMERATED { i0, i1 }
}

PUCCH-SpatialRelationInfo-r16 ::= SEQUENCE {
   pucch-SpatialRelationInfoId-r16 PUCCH-SpatialRelationInfoId-r16,
   servingCellId-r16               ServCellIndex   OPTIONAL, -- Need S
   referenceSignal-r16             CHOICE {
      ssb-Index                       SSB-Index,
      csi-RS-Index                    NZP-CSI-RS-ResourceId,
      srs                             PUCCH-SRS
},
   pucch-PathlossReferenceRS-Id-r16 PUCCH-PathlossReferenceRS-Id-r16,
   p0-PUCCH-Id-r16                 P0-PUCCH-Id,
   closedLoopIndex-r16             ENUMERATED { i0, i1 }
}

PUCCH-SRS ::= SEQUENCE {
   resource                        SRS-ResourceId,
   uplinkBWP                       BWP-Id
}

-- TAG-PUCCH-SPATIALRELATIONINFO-STOP
-- ASN1STOP
```

*FIG. 5*

```
SRS-SpatialRelationInfo ::= SEQUENCE {
  servingCellId          ServCellIndex OPTIONAL, -- Need S
  referenceSignal CHOICE {
    ssb-Index            SSB-Index,
    csi-RS-Index         NZP-CSI-RS-ResourceId,
    srs SEQUENCE {
      resourceId         SRS-ResourceId,
      uplinkBWP          BWP-Id
    }
  }
}
```

FIG. 6

ControlResourceSetId INFORMATION ELEMENT

```
-- ASN1START
-- TAG-CONTROLRESOURCESETID-START

ControlResourceSetId ::=    Integer (0..maxNrofControlResourceSets-1)

--TAG-CONTROLRESOURCESETID-STOP

--ASN1STOP
```

FIG. 8

MULTIPLICITY AND TYPE CONSTRAINT DEFINITIONS

```
-- ASN1START
-- TAG-MULTIPLICITY-AND-TYPE-CONSTRAINT-DEFINITIONS-START
…
maxNrofBWPs                    INTEGER ::= 4       -- Maximum number of BWPs per
                                                      serving cell
…
maxNrofControlResourceSets-1   INTEGER ::= 11      -- Max number of CoReSets
                                                      configurable on a serving
                                                      cell minus 1
```

*FIG. 9*

DCI-BASED TCI STATE UPDATE WITH FLEXIBLE CHANNEL SELECTION

RELATED APPLICATIONS

This application is a 35 U.S.C. § 371 national phase filing of International Application No. PCT/EP2021/078746, filed Oct. 18, 2021, which claims the benefit of provisional patent application Ser. No. 63/094,611, filed Oct. 21, 2020, the disclosures of which are incorporated herein by reference in their entireties.

TECHNICAL FIELD

The present disclosure relates to Downlink Control Information (DCI)-based Transmission Configuration Indicator (TCI) state update functionality in a cellular communications system.

BACKGROUND

The new Fifth Generation (5G) mobile wireless communication system or New Radio (NR) supports a diverse set of use cases and a diverse set of deployment scenarios.

NR uses Cyclic Prefix Orthogonal Frequency Division Multiplexing (OFDM) (CP-OFDM) in the downlink (i.e., from a network node, gNB, eNB, or base station, to a user equipment (UE)) and both CP-OFDM and Discrete Fourier Transform (DFT)-spread OFDM (DFT-S-OFDM) in the uplink (i.e., from UE to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe and each slot always consists of 14 OFDM symbols, irrespective of the subcarrier spacing.

Typical data scheduling in NR are per slot basis. An example is shown in FIG. 1, where the first two symbols contain physical downlink control channel (PDCCH) and the remaining 12 symbols contain physical data channel (PDCH), either a physical downlink shared channel (PDSCH) or physical uplink shared channel (PUSCH).

Different subcarrier spacing values are supported in NR. The supported subcarrier spacing values (also referred to as different numerologies) are given by $\Delta f=(15\times 2a)$ kHz where $\alpha$ is a non-negative integer. $\Delta f=15$ kHz is the basic subcarrier spacing that is also used in Long Term Evolution (LTE). The slot durations at different subcarrier spacings are shown in Table 1 below:

TABLE 1

| Numerology | Slot Length | RB Bandwidth (BW) |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

In the frequency domain physical resource definition, a system bandwidth is divided into resource blocks (RBs), each corresponds to 12 contiguous subcarriers. The common RBs (CRB) are numbered starting with zero (0) from one end of the system bandwidth. The UE is configured with one or up to four (4) bandwidth part (BWPs) which may be a subset of the RBs supported on a carrier. Hence, a BWP may start at a CRB larger than zero. All configured BWPs have a common reference, the CRB 0. Hence, a UE can be configured a narrow BWP (e.g., 10 MHz) and a wide BWP (e.g., 100 MHz), but only one BWP can be active for the UE at a given point in time. The physical RB (PRB) are numbered from 0 to N−1 within a BWP (but the 0:th PRB may thus be the K:th CRB where K>0).

The basic NR physical time-frequency resource grid is illustrated in FIG. 2, where only one (1) RB within a 14-symbol slot is shown. One (1) OFDM subcarrier during one (1) OFDM symbol interval forms one resource element (RE).

Downlink transmissions can be dynamically scheduled (i.e., in each slot the gNB transmits downlink control information (DCI) over PDCCH about which UE data is to be transmitted to and which RBs in the current downlink slot the data is transmitted on). PDCCH is typically transmitted in the first one (1) or two (2) OFDM symbols in each slot in NR. The UE data are carried on PDSCH. A UE first detects and decodes PDCCH and, if the decoding is successful, the UE then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

Messages transmitted over the radio link to users can be broadly classified as control messages or data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on. Examples of control messages in NR are the PDCCH which for example carry scheduling information and power control messages. Depending on what control data that is conveyed in the PDCCH, different DCI formats can be used. The PDCCH messages in NR are demodulated using the PDCCH demodulation reference signal (DMRS) that is frequency multiplexed with DCI. This means that the PDCCH is a self-contained transmission which enables beamforming of the PDCCH.

In NR, the PDCCH is located within one or several configurable/dynamic control regions called control resource sets (CORESETs). The size of the CORESET, with respect to time and frequency, is flexible in NR. In frequency domain, the allocation is done in units of six (6) resource blocks using a bitmap, and in time domain, a CORESET can consist of one (1) to three (3) consecutive OFDM symbols. A CORESET is then associated with a search space set to define when in time the UE should monitor the CORESET. The search space set includes, for example, parameters defining the periodicity, an OFDM start symbol within a slot, a slot-level offset, which DCI formats to blindly decode, and the aggregation level of the DCI formats. This means that a CORESET and the associated search space set together define when in time and frequency the UE should monitor for control channel reception. Even though OFDM PDCCH can be located in any OFDM symbol in a slot, it is expected that the PDCCH mainly will be scheduled in the first few OFDM symbols of a slot in order to enable early data decoding and low-latency.

A UE can be configured with up to five CORESETs per "PDCCH-Config," which means that the maximum number of CORESETs per serving cell is 20 (since the maximum number of BWPs per serving cell is four (4), it gives 4*5=20). Each CORESET can be configured with a TCI state containing a downlink reference signal (DL-RS) as spatial Quasi-Co-Located (QCL) indication, indicating to the UE a spatial direction from where the UE can assume to receive the PDCCHs corresponding to that CORESET. To improve the reliability (e.g., to counteract radio link failure (RLF) due to blocking) a UE can be configured with multiple CORESETs, each with different spatial QCL assumptions (TCI states). In this way, in case one beam pair link is blocked (for example a beam pair link associated with a first spatial QCL relation), the UE might still be reached by the network by transmitting PDCCH associated with a CORSET configured with another spatial QCL relation.

In high frequency range (i.e., frequency range 2 (FR2)), multiple radio frequency (RF) beams may be used to transmit and receive signals at a gNB and a UE. For each downlink (DL) beam from a gNB, there is typically an associated best UE receiver (Rx) beam for receiving signals from the DL beam. The DL beam and the associated UE Rx beam forms a beam pair. The beam pair can be identified through a so-called beam management process in NR.

A DL beam may be identified by an associated DL reference signal (RS) transmitted in the beam, either periodically, semi-persistently, or aperiodically. The DL RS for the purpose can be a Synchronization Signal (SS) and Physical Broadcast Channel (PBCH) block (SSB) or a Channel State Information RS (CSI-RS). For each DL RS, a UE can do a Rx beam sweep to determine the best Rx beam associate with the DL beam. The best Rx beam for each DL RS is then memorized by the UE. By measuring all the DL RSs, the UE can determine and report to the gNB the best DL beam to use for DL transmissions.

With the reciprocity principle, the same beam pair can also be used in the uplink (UL) to transmit a UL signal to the gNB, often referred to as beam correspondence.

An example is shown in in FIG. 3, where a gNB consists of a transmission point (TRP) with two DL beams each associated with a CSI-RS and one SSB beam. Each of the DL beams is associated with a best UE Rx beam, i.e., Rx beam #1 is associated with the DL beam with CSI-RS #1 and Rx beam #2 is associated with the DL beam with CSI-RS #2.

Due to UE movement or environment change, the best DL beam for a UE may change over time and different DL beams may be used in different times. The DL beam used for a DL data transmission in PDSCH can be indicated by a transmission configuration indicator (TCI) field in the corresponding DCI scheduling the PDSCH or activating the PDSCH in case of Semi-Persistent Scheduling (SPS). The TCI field indicates a TCI state which contains a DL RS associated with the DL beam. In the DCI, a physical uplink control channel (PUCCH) resource is indicated for carrying the corresponding Hybrid Automatic Repeat request (HARQ) ACK/NACK. The UL beam for carrying the PUCCH is determined by a PUCCH spatial relation activated for the PUCCH resource. For PUSCH transmission, the UL beam is indicated indirectly by a sounding reference signal (SRS) resource indicator (SRI), which points to one or more SRS resources associated with the PUSCH transmission. The SRS resource(s) can be periodic, semi-persistent, or aperiodic. Each SRS resource is associated with an SRS spatial relation in which a DL RS (or another periodic SRS) is specified. The UL beam for the PUSCH is implicitly indicated by the SRS spatial relation(s).

Spatial relation is used in NR to refer to a spatial relationship between an UL channel or signal, such as PUCCH, PUSCH and SRS, and a DL (or UL) RS, such as CSI-RS, SSB, or SRS. If an UL channel or signal is spatially related to a DL RS, it means that the UE should transmit the UL channel or signal with the same beam used in receiving the DL RS previously. More precisely, the UE should transmit the UL channel or signal with the same spatial domain transmission filter used for the reception of the DL RS.

If a UL channel or signal is spatially related to a UL SRS, then the UE should apply the same spatial domain transmission filter for the transmission for the UL channel or signal as the one used to transmit the SRS.

Using DL RSs as the source RS in a spatial relation is very effective when the UE can transmit the UL signal in the opposite direction from which it previously received the DL RS, or in other words, if the UE can achieve the same transmission (Tx) antenna gain during transmission as the antenna gain it achieved during reception. This capability (known as beam correspondence) will not always be perfect; due to, e.g., imperfect calibration, the UL Tx beam may point in another direction, resulting in a loss in UL coverage. To improve the performance in this situation, UL beam management based on SRS sweeping can be used, as outlined in. To achieve optimum performance, the procedure depicted in FIG. 4 should be repeated as soon as the UEs Tx beam changes.

FIG. 4 illustrates UL beam management using an SRS sweep. In the first step, the UE transmits a series of UL signals (SRS resources), using different Tx beams. The gNB then performs measurements for each of the SRS transmissions, and determines which SRS transmission was received with the best quality, or highest signal quality. The gNB then signals the preferred SRS resource to the UE. The UE subsequently transmits the PUSCH in the same beam where it transmitted the preferred SRS resource.

For PUCCH, up to 64 spatial relations can be configured for a UE and one of the spatial relations is activated by a Medium Access Control (MAC) Control Element (CE) for each PUCCH resource.

FIG. 5 is a PUCCH spatial relation (PUCCH-SpatialRelationInfo) information element (IE) that a UE can be configured in NR, it includes one of a SSB index, a CSI-RS resource identity (ID), and SRS resource ID as well as some power control parameters such as pathloss RS, closed-loop index, etc.

For each periodic and semi-persistent SRS resource or aperiodic SRS with usage “non-codebook” configured, its associated DL CSI-RS is Radio Resource Control (RRC) configured. For each aperiodic SRS resource with usage “codebook” configured, the associated DL RS is specified in an SRS spatial relation activated by a MAC CE. An example is shown in FIG. 6, where one of a SSB index, a CSI-RS resource ID, and SRS resource ID is configured.

For PUSCH, its spatial relation is defined by the spatial relation of the corresponding SRS resource(s) indicated by the SRI in the corresponding DCI.

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, the TCI state may indicate a QCL relation between a CSI-RS for tracking RS (TRS) and the PDSCH DMRS. When UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL Type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that use analog beamforming to receive signals, since the UE need to adjust its Rx beam in some direction prior to receiving a certain signal. If the UE knows that the signal is spatially QCL with some other signal it has received earlier, then it can safely use the same RX beam to also receive this signal. Note that for beam management, the discussion mostly revolves around QCL Type D, but it is also necessary to convey a QCL Type A relation for the RSs to the UE, so that it can estimate all the relevant large-scale parameters.

Typically, this is achieved by configuring the UE with a CSI-RS for TRS for time/frequency offset estimation. To be able to use any QCL reference, the UE would have to receive it with a sufficiently good signal-to-interference-plus-noise (SINR). In many cases, this means that the TRS has to be transmitted in a suitable beam to a certain UE.

To introduce dynamics in beam and TRP selection, the UE can be configured through RRC signaling with M TCI states, where M is up to 128 in FR2 for the purpose of PDSCH reception and up to 8 in frequency range 1 (FR1), depending on UE capability.

Each TCI state contains QCL information, i.e., one or two source DL RSs, each source RS associated with a QCL type. For example, a TCI state contains a pair of reference signals, each associated with a QCL type, e.g., two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the Rx beam to use) from CSI-RS2.

Each of the M states in the list of TCI states can be interpreted as a list of M possible beams transmitted from the network or a list of M possible TRPs used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight active TCI states for PDSCH. The number of active TCI states the UE support is a UE capability, but the maximum is 8.

Each configured TCI state contains parameters for the quasi-co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with 4 active TCI states (from a list of totally 64 configured TCI states). Hence, 60 TCI states are inactive for this particular UE (but some may be active for another UE), and the UE need not be prepared to have large scale parameters estimated for those. But the UE continuously tracks and updates the large scale parameters for the 4 active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

Now the details of the MAC CE signaling that is used to indicate TCI state for UE specific PDCCH are discussed. The structure of the MAC CE for indicating TCI state for UE specific PDCCH is given in FIG. 7.

As shown in FIG. 7, the MAC CE contains the following fields:

Serving Cell ID: This field indicates the identity of the Serving Cell for which the MAC CE applies. The length of the field is 5 bits;

CORESET ID: This field indicates a Control Resource Set identified with ControlResourceSetId as specified in 3GPP TS 38.331 version 16.2.0 (referred to hereinafter as “3GPP TS 38.331” or “TS 38.331”), for which the TCI State is being indicated. In case the value of the field is 0, the field refers to the Control Resource Set configured by controlResourceSetZero as specified in TS 38.331. The length of the field is 4 bits;

TCI State ID: This field indicates the TCI state identified by TCI-StateId as specified in TS 38.331 applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

The MAC CE for Indication of TCI States for UE-specific PDCCH has a fixed size of 16 bits.

Note that CORESET ID identified with ControlResourceSetId is specified in 3GPP TS 38.331 as follows. The ControlResourceSetId IE concerns a short identity, used to identify a control resource set within a serving cell. The ControlResourceSetId=0 identifies the ControlResourceSet #0 configured via PBCH (MIB) and in controlResourceSetZero (ServingCellConfigCommon). The ID space is used across the BWPs of a Serving Cell. The number of CORESETs per BWP is limited to 3 (including common and UE-specific CORESETs), as shown in FIG. 8.

In NR Rel-15, maxNrofContro/ResourceSets representing the maximum number of CORESETs per serving cell is 12. The maximum number of BWPs per serving cell is 4 in NR Rel-15. These maximum values are defined in TS 38.331 Section 6.4 as seen in FIG. 9.

Now the details of the MAC CE signaling that is used to activate/deactivate TCI states for UE specific PDSCH are discussed. The structure of the MAC CE for activating/deactivating TCI states for UE specific PDSCH is given in FIG. 10.

As shown in FIG. 10, the MAC CE contains the following fields:

- Serving Cell ID: This field indicates the identity of the Serving Cell for which the MAC CE applies. The length of the field is five (5) bits;
- BWP ID: This field contains the ID corresponding to a downlink bandwidth part for which the MAC CE applies. The BWP ID is given by the higher layer parameter BWP-Id as specified in 3GPP TS 38.331. The length of the BWP ID field is 2 bits since a UE can be configured with up to four (4) BWPs for DL;
- A variable number of fields $T_i$: If the UE is configured with a TCI state with TCI State ID $i$, then then the field $T_i$ indicates the activation/deactivation status of the TCI state with TCI State ID i. If the UE is not configured with a TCI state with TCI State ID $i$, the MAC entity shall ignore the $T_i$ field. The $T_i$ field is set to "1" to indicate that the TCI state with TCI State ID i shall be activated and mapped to the codepoint of the DCI Transmission Configuration Indication field, as specified in 3GPP TS 38.214, version 16.3.0. The $T_i$ field is set to "0" to indicate that the TCI state with TCI State ID i shall be deactivated and is not mapped to the codepoint of the DCI Transmission Configuration Indication field. It should be noted that the codepoint to which the TCI State is mapped is determined by the ordinal position among all the TCI States with $T_i$ field set to "1". That is the first TCI State with $T_i$ field set to "1" shall be mapped to the codepoint value 0 of DCI Transmission Configuration Indication field, the second TCI State with $T_i$ field set to "1" shall be mapped to the codepoint value 1 of DCI Transmission Configuration Indication field, and so on. In NR Rel-15, the maximum number of activated TCI states is 8;
- A Reserved bit R: this bit is set to '0' in NR Rel-15.

Note that the TCI States Activation/Deactivation for UE-specific PDSCH MAC CE is identified by a MAC protocol data unit (PDU) subheader with logical channel ID (LCID) as specified in Table 6.2.1-1 of 3GPP TS 38.321, version 16.2.0 (referred to hereinafter as "3GPP TS 38.321"), reproduced below as Table 2. The MAC CE for Activation/Deactivation of TCI States for UE-specific PDSCH has variable size.

TABLE 2

Values of LCID for DL-SCH (Extracted from Table 6.2.1-1 of 3GPP TS 38.321)

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |

TABLE 2-continued

Values of LCID for DL-SCH (Extracted from Table 6.2.1-1 of 3GPP TS 38.321)

| Index | LCID values |
|---|---|
| 61 | Timing Advance Command |
| 62 | UE Contention Resolution Identity |
| 63 | Padding |

To facilitate UL beam selection for UEs equipped with multiple panels, a unified TCI framework for UL fast panel selection is to be evaluated and introduced in NR Rel-17. Similar to DL, where TCI states are used to indicate DL beams/TRPs, TCI states may also be used to select UL panels and beams used for UL transmissions (i.e., PUSCH, PUCCH, and SRS).

It is envisioned that UL TCI states are configured by higher layers (i.e., RRC) for a UE in a number of possible ways. In one scenario, UL TCI states are configured separately from the DL TCI states and each uplink TCI state may contain a DL RS (e.g., non-zero-power (NZP) CSI-RS or SSB) or an UL RS (e.g., SRS) to indicate a spatial relation. The UL TCI states can be configured either per UL channel/signal or per BWP such that the same UL TCI states can be used for PUSCH, PUCCH, and SRS. Alternatively, a same list of TCI states may be used for both DL and UL, hence a UE is configured with a single list of TCI states for both UL and DL beam indication. The single list of TCI states in this case can be configured either per UL channel/signal or per BWP information elements.

DCI is used in NR to, among other things, transmit scheduling decisions from the gNB to the UE. Different DCI formats are defined for different purposes, differing in, e.g., the information carried in the DCI. DCI formats defined for NR include:

- formats 0-0 and 0-1/0-2 for uplink scheduling, and
- formats 1-0 and 1-1/1-2 for downlink scheduling.

The number of bits in the DCI (i.e., the DCI size), as well as the division of the bits between different information fields in the DCI, can either be fixed or depend on higher-layer configuration. In general, formats 0-0 and 1-0 are fixed in size, while the size of formats 0-1/0-2 and 1-1/1-2 depend on higher-layer configuration (for example when the DCI format is to be used with different MIMO configurations).

To indicate which UE(s) is/are addressed (and sometimes to indicate the purpose of the DCI), an identity (e.g., a Radio Network Temporary Identifier (RNTI)) is used to scramble the cyclic redundancy check (CRC) of the DCI transmitted. There are multiple RNTIs defined. For example,

- C-RNTI, CS-RNTI, and MCS-C-RNTI intended to address a single UE for uplink or downlink scheduling purposes,
- P-RNTI for paging messages addressing multiple UEs,
- RA-RNTI for random-access response (possibly addressing multiple UEs), and
- SI-RNTI for scheduling system information to multiple UEs.

The UE blindly attempts to decode DCI messages using the RNTIs the UE is supposed to monitor. If the CRC checks, the DCI is correctly received and is intended for this UE, and the UE follows the content of the DCI. If the CRC does not check, it is because of either the DCI was received in error or was intended for another UE; in either case, the UE ignores it. Blindly detecting the DCI is done according to search spaces which can be configured to the UE. Search spaces can be either common search spaces (CSS) or UE-specific search spaces (USS). Not all RNTIs are allowed in all search spaces. For example, P-RNTI/RA-RNTI and SI-RNTI, which all use DCI format 0_0, are only allowed in CSS, C-RNTI/CS-RNTI/MCS-C-RNTI using DCI formats 0_0 or 1_0 are allowed in either CSS or USS, and C-RNTI/CS-RNTI/MCS-C-RNTI using DCI formats 0_1, 0_2, 1_1 or 1_2 are allowed in USS only.

To summarize, a UE can differentiate different DCI formats (and hence how to interpret the bits in the DCI) by using one or more of:

the DCI size, the search space the DCI was detected in, the RNTI, and the format indicator bit.

A three-stage approach to activating a TCI state to a CORESET is discussed in document R1-2003483, "Preliminary views on further enhancements for NR MIMO." In the first stage, RRC is used to configure a pool of TCI states. In the second stage, one or more of the RRC configured TCI states are activated via MAC-CE signaling. Finally, in the third stage, DCI signaling is used to select one of the TCI states that was activated via MAC-CE.

Further details of the configuration and signaling related to the three-stage indication of TCI state for PDCCH has been outlined in document P082004, "Signaling for TCI state CORESET with DCI."

SUMMARY

Method and apparatus are disclosed herein for providing Downlink Control Information (DCI)-based Transmission Configuration Indicator (TCI) state update with flexible channel selection. Embodiments disclosed herein enable provide an efficient and flexible mechanism to enable a New Radio (NR) base station (gNB) to indicate whether a DCI-based TCI state update should be applied to one or multiple different channels and/or signals.

Embodiments of a method performed by a network node of a cellular communication system to provide DCI-based TCI state update with flexible channel selection are disclosed herein. The method comprises transmitting, to a User Equipment (UE), a DCI, wherein a DCI format of the DCI comprises a TCI state update indication, and a TCI state update application indication indicating one or more channels or signals to which the TCI state update is to be applied by the UE. Some embodiments disclosed herein provide that the TCI state update application indication comprises a bitfield within the DCI. According to some such embodiments disclosed herein, the bitfield comprises one (1) bit; a first codepoint of in the bitfield indicates that the TCI state update should only be applied to one or more of a physical downlink shared channel (PDSCH), a physical uplink control channel (PUCCH), and a sounding reference signal (SRS) triggered by the DCI, and a second codepoint of the bitfield indicates that the TCI state update should be applied to one or more of the PDSCH, the PUCCH, and the SRS triggered by the DCI, and to a physical downlink control channel (PDCCH) and other channels or signals not triggered by the DCI. In some such embodiments disclosed herein, the bitfield comprises a plurality of bits. Some such embodiments disclosed herein provide that the bitfield comprises two (2) bits; a first codepoint of the bitfield indicates that the TCI state update should be applied only to a PDSCH, a PUCCH, or an SRS triggered by the DCI; a second codepoint of the bitfield indicates that the TCI state update should be applied only to a PDCCH; a third codepoint of the bitfield indicates that the TCI state update should be applied to all downlink (DL) signals; and a fourth codepoint of the bitfield indicates that the TCI state update should be applied to all uplink (UL) signals. According to some such embodiments disclosed herein, a codepoint of the TCI state update indication points to two TCI states comprising a TCI state for DL channels and a TCI state for UL channels.

In some embodiments disclosed herein, the TCI state update application indication comprises using one of a plurality of Radio Network Temporary Identifiers (RNTIs) to scramble the cyclic redundancy check (CRC) of the DCI. Some such embodiments disclosed herein provide that a first RNTI of the plurality of RNTIs indicates that the TCI state update should be applied only to a PDSCH, a PUCCH, or an SRS triggered by the DCI; a second RNTI of the plurality of RNTIs indicates that the TCI state update should be applied only to a control resource set (CORESET) in which the DCI is conveyed; and a third RNTI of the plurality of RNTIs indicates that the TCI state update should be applied to all DL signals, a subset of all DL signals, all UL signals, or a subset of all UL signals.

According to some embodiments disclosed herein, the TCI state update application indication comprises a Radio Resource Control (RRC) configured parameter. In some such embodiments disclosed herein, the TCI state update indicated in the DCI is applied to all DL and UL channels being configured to the UE and to path loss reference signals. Some such embodiments disclosed herein provide that the TCI state update indicated in the DCI is applied to a PUCCH and a physical uplink shared channel (PUSCH) and all DL channels, but is not applied to an SRS. According to some such embodiments disclosed herein, the RRC configured parameter indicates to which a PUCCH resource and/or PUCCH resource group the TCI state update indicated in the DCI is applied. In some such embodiments disclosed herein, the RRC configured parameter comprises a list of CORESETs to which the TCI state update indicated in the DCI is applied. Some such embodiments disclosed herein provide that the RRC configured parameter comprises a CORESET pool index to which the TCI state update indicated in the DCI is applied. According to some such embodiments disclosed herein, the RRC configured parameter is configured in a PDSCH_Config information element (IE). In some such embodiments disclosed herein, the RRC configured parameter is configured per serving cell, such that all bandwidth parts (BWPs) of a configured serving cell follow a same configuration. Some such embodiments disclosed herein provide that the RRC configured parameter is configured for a list of serving cells.

In some embodiments disclosed herein, the UE is configured with a single CORESET; a list of TCI states is activated, with each activated TCI state mapped to a codepoint; and the DCI comprises an indication from the network node signaling the codepoint to select one of the activated TCI states for use by the UE as a quasi-co-located (QCL) source for all DL and UL signals. Some such embodiments disclosed herein provide that the UE is configured with two (2) CORESETs, each with a different CORESETPoolIndex; the DCI comprises a codepoint for the TCI state update indication transmitted in a CORESET associated with a first CORESETPoolIndex; and the DCI updates a TCI state of the CORESET and all DL and UL signals later triggered by a subsequent DCI transmitted in the CORESET.

According to some embodiments disclosed herein, the TCI state update indicated in the DCI is applied to different signals and/or different channels corresponding to different DCI formats of the DCI. In some such embodiments disclosed herein, a TCI state update in DCI format 0_1 is applied to an SRS and a PUSCH, and a TCI state update in DCI format 1_1 is applied to a PDSCH and a PDCCH. Some embodiments disclosed herein provide that the DCI format comprises a DL DCI format, and the TCI state update is applied to all DL channels or signals. According to some embodiments disclosed herein, the DCI format comprises an UL DCI format, and the TCI state update is applied to all UL channels or signals.

Embodiments of a network node for a core network of a cellular communications system where the network node is enabled to provide DCI-based TCI state update with flexible channel selection are also disclosed herein. In some embodiments disclosed herein, the network node comprises a network interface, and processing circuitry associated with the network interface. The processing circuitry is configured to cause the network node to transmit, to a UE, a DCI, wherein a DCI format of the DCI comprises a TCI state update indication, and a TCI state update application indication indicating one or more channels or signals to which the TCI state update is to be applied by the UE. Some embodiments disclosed herein provide that the processing circuitry is further configured to cause the network node to perform the steps of any of the above-disclosed methods attributed to the network node.

Embodiments of a network node for a core network of a cellular communications system where the network node is enabled to provide DCI-based TCI state update with flexible channel selection are also disclosed herein. According to some embodiments disclosed herein, the network node is adapted to transmit, to a UE, a DCI, wherein a DCI format of the DCI comprises a TCI state update indication, and a TCI state update application indication indicating one or more channels or signals to which the TCI state update is to be applied by the UE. In some embodiments disclosed herein, the network node is further adapted to cause the network node to perform the steps of any of the above-disclosed methods attributed to the network node.

Embodiments of a method performed by a UE of a cellular communication system to provide DCI-based TCI state update with flexible channel selection are also disclosed herein. Some embodiments disclosed herein provide that the method comprises receiving, from a network node, a DCI, wherein a DCI format of the DCI comprises a TCI state update indication, and a TCI state update application indication indicating one or more channels or signals to which the TCI state update is to be applied by the UE. The method further comprises applying the TCI state update as indicated by the TCI state update application indication. According to some embodiments disclosed herein, the DCI indicates more than one UL TCI state associated with a PUSCH transmission and activates a Configured Grant (CG) transmission, and applying the TCI state update comprises transmitting a CG PUSCH with one of the indicated UL TCI states only if a measurement based on the associated downlink reference signal (DL-RS) for the UL TCI satisfies a measurement criteria. In some such embodiments disclosed herein, the measurement criteria comprise a threshold value for reference signal received power (RSRP) measurement, a threshold value for signal-to-interference-plus-noise (SINR) measurement, and/or a time duration during which the measurement satisfies a threshold requirement. Some such embodiments disclosed herein provide that all TCI being configured to the CG satisfy the measurement criteria, and transmitting the CG PUSCH comprises transmitting the CG PUSCH with the TCI with a lowest configure index or with a best measurement result. According to some embodiments disclosed herein, the TCI state update application indication is in accordance with any one of the steps of any of the above-disclosed methods attributed to the network node. In some embodiments disclosed herein, the TCI state update and the DCI format are in accordance with any one of the steps of any of the above-disclosed methods attributed to the network node.

Embodiments of a UE are also disclosed herein. Some embodiments disclosed herein provide that the UE comprises one or more transmitters, one or more receivers, and processing circuitry associated with the one or more transmitters and the one or more receivers. The processing circuitry is configured to cause the UE to receive, from a network node, a DCI, wherein a DCI format of the DCI comprises a TCI state update indication, and a TCI state update application indication indicating one or more channels or signals to which a TCI state update is to be applied by the UE. The processing circuitry is further configured to apply the TCI state update as indicated by the TCI state update application indication. According to some embodiments disclosed herein, the processing circuitry is further configured to cause the UE to perform the steps of any of the above-disclosed methods attributed to the UE.

Embodiments of a UE are also disclosed herein. In some embodiments disclosed herein, the UE is adapted to receive, from a network node, a DCI, wherein a DCI format of the DCI comprises a TCI state update indication, and a TCI state update application indication indicating one or more channels or signals to which a TCI state update is to be applied by the UE. The UE is further adapted to apply the TCI state update as indicated by the TCI state update application indication. Some embodiments disclosed herein provide that the UE is further adapted to perform the steps of any of the above-disclosed methods attributed to the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5 illustrates an exemplary Physical Uplink Control Channel (PUCCH) spatial relation Information Element (IE) with which User Equipment (UE) can be configured in NR;

FIG. 6 illustrates an example in which a DL reference signal (RS) is specified in an SRS spatial relation activated by a Medium Access Control (MAC) Control Element (CE);

FIG. 8 illustrates an exemplary ControlResourceSetId IE used to identify a control resource set within a serving cell;

FIG. 9 illustrates exemplary multiplicity and type constraint definitions for control resource sets and bandwidth parts (BWPs);

DETAILED DESCRIPTION

Figure 1:
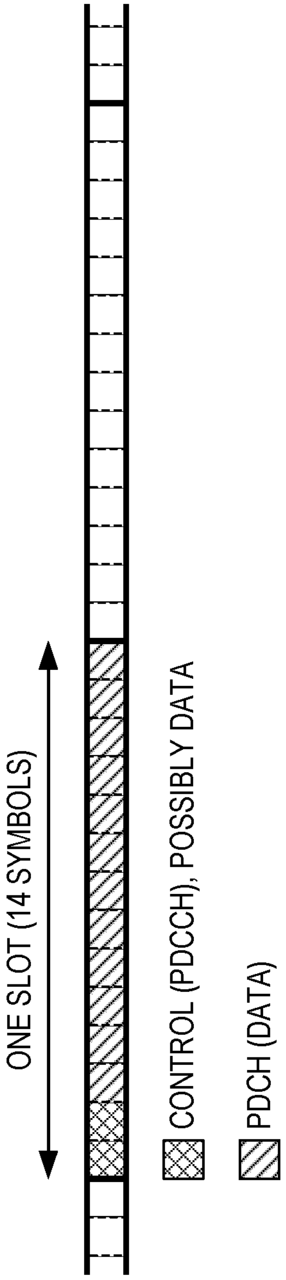
FIG. 1 illustrates an example of per-slot data scheduling in New Radio (NR)
Figure 2:
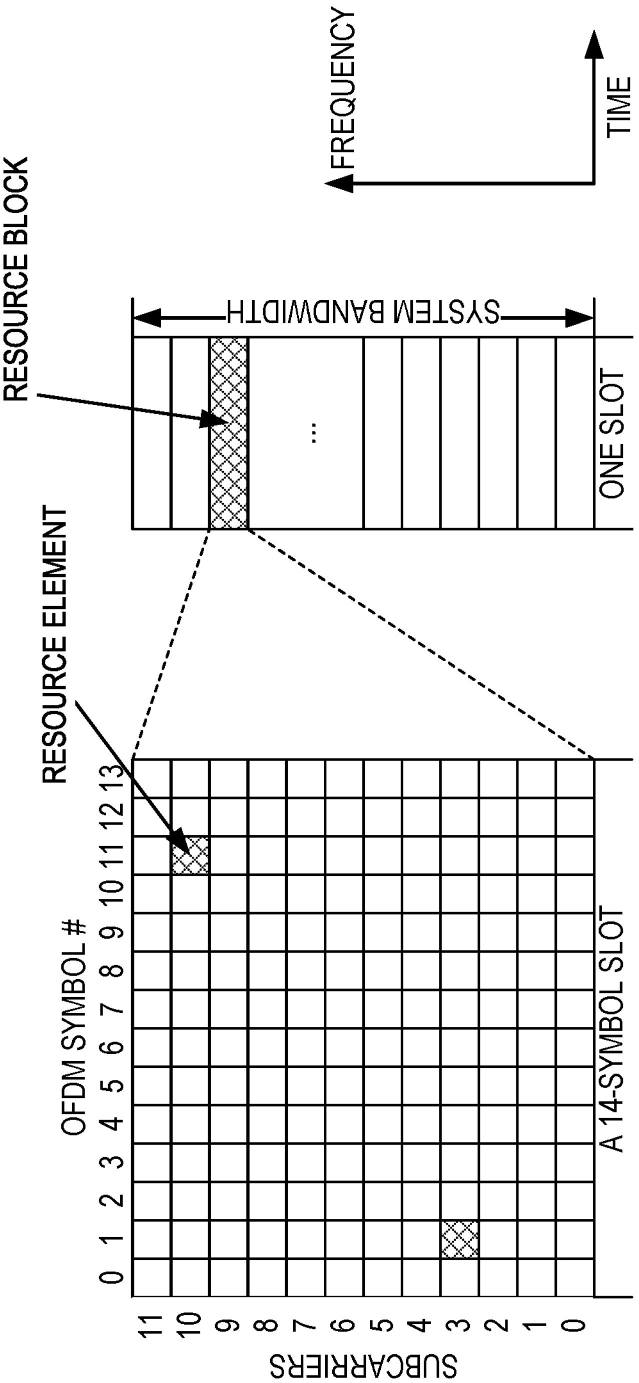
FIG. 2 illustrates an exemplary NR physical time-frequency resource grid.
Figure 3:
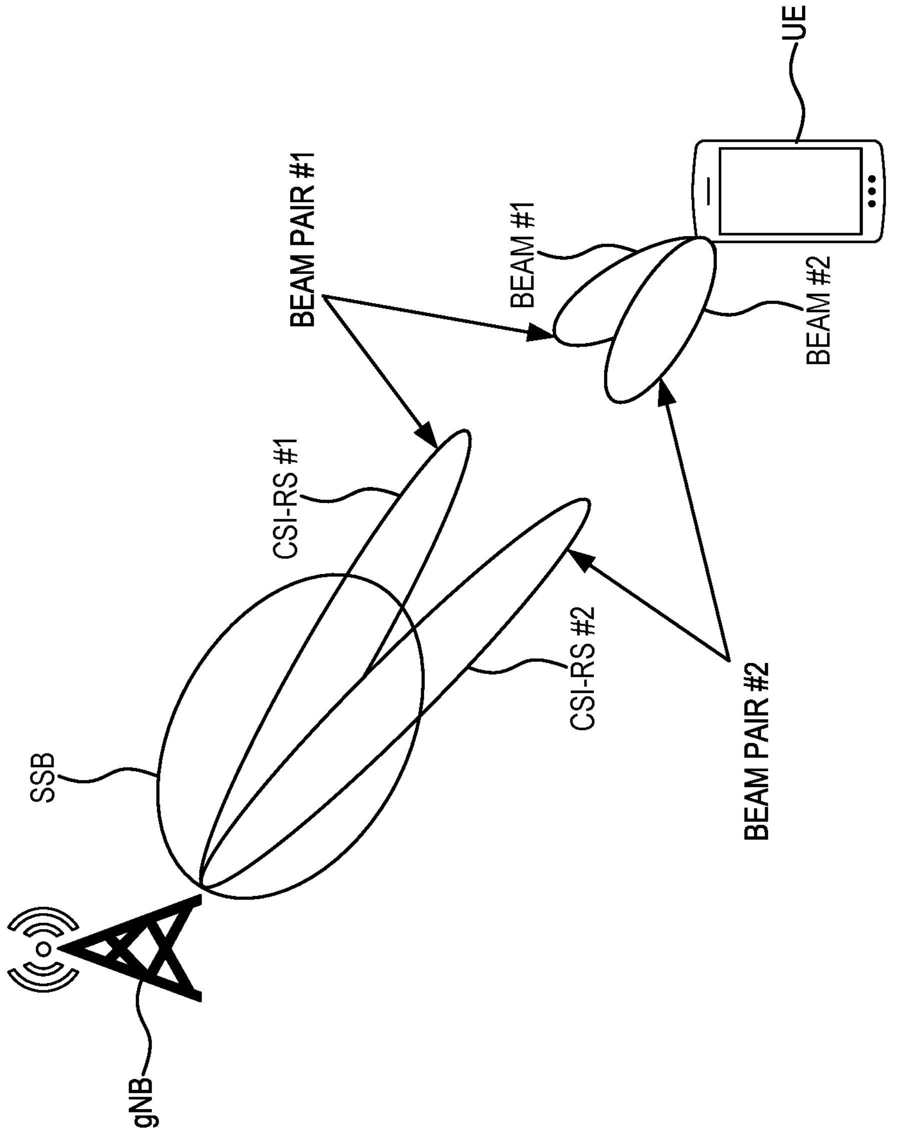
FIG. 3 illustrates an example of beam correspondence, in which an NR base station (gNB) provides a Transmission Point (TRP) with two downlink (DL) beams each associated with a Channel State Information Reference Signal (CSI-RS) and one Synchronization Signal (SS) and Physical Broadcast Channel (PBCH) block (SSB) beam.
Figure 4:
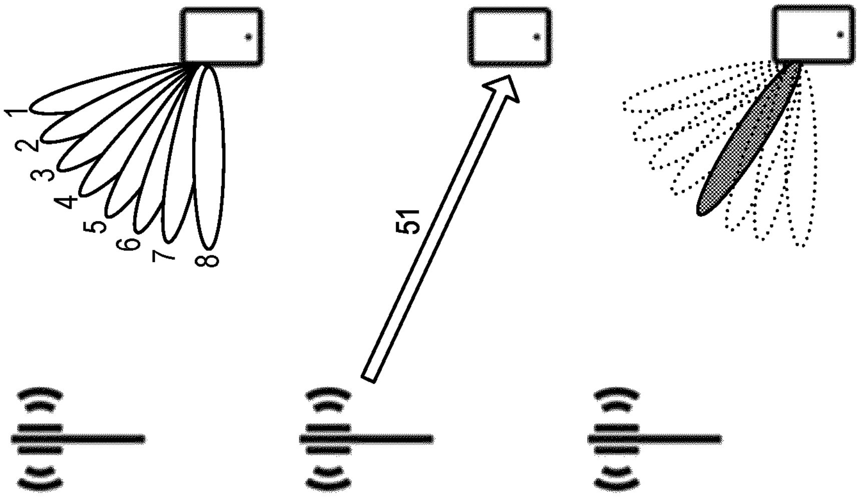
FIG. 4 illustrates an example of uplink (UL) beam management using a Sounding Reference Signal (SRS) sweep.
Figure 7:
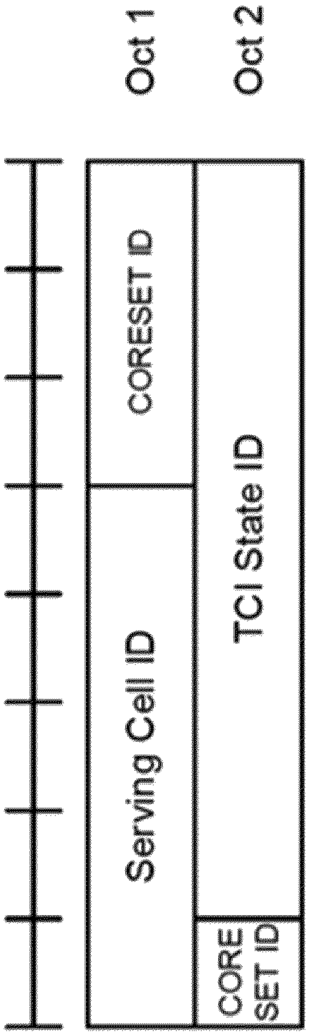
FIG. 7 illustrates an exemplary structure of a MAC CE for indicating Transmission Configuration Indicator (TCI) state for a UE-specific Physical Downlink Control Channel (PDCCH)
Figure 10:
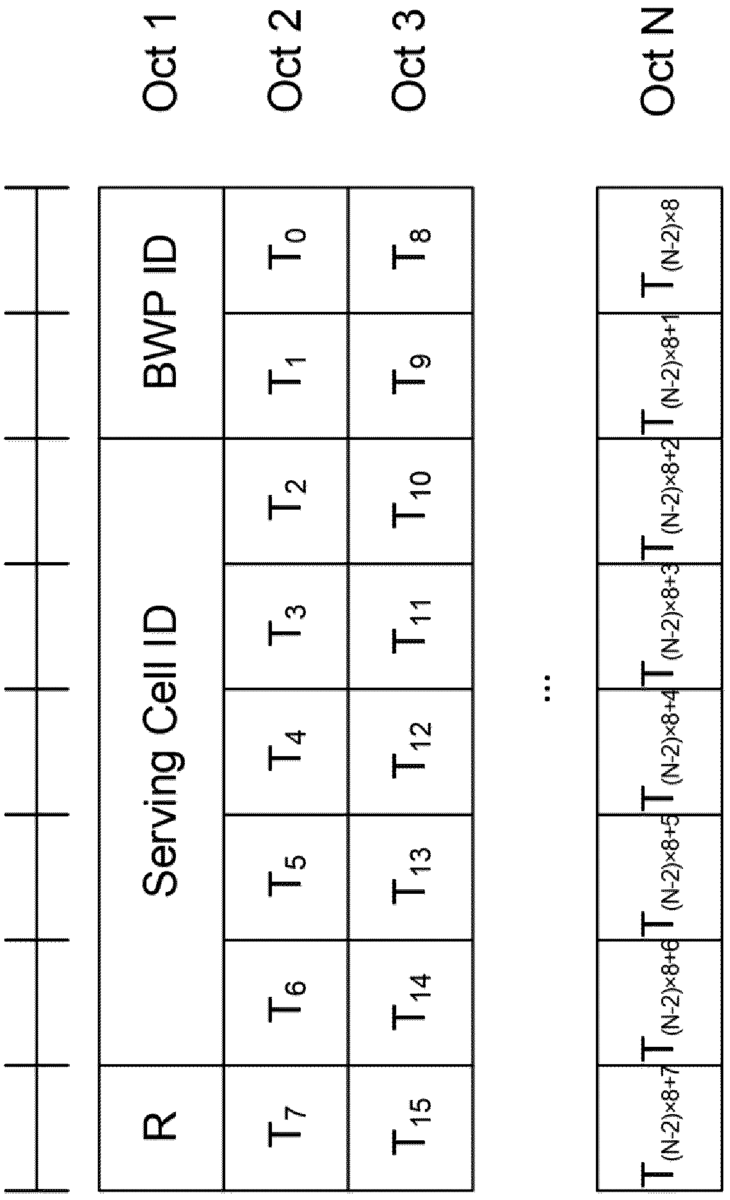
FIG. 10 illustrates one example of a cellular communications system according to some embodiments disclosed herein.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s) with existing approaches. In particular, when the Transmission Configuration Indicator (TCI) state for Physical Downlink Control Channels (PDCCH) is updated via Downlink Control Information (DCI) (e.g., using the three-stage indication described above), one open issue is whether this TCI update only applies to PDCCH or if it can be applied to other channels/signals as well. It is also an open problem as far as how the TCI state update for PDCCH provided via DCI can be applied to other channels/signals.

Accordingly, the present disclosure and embodiments therein may provide solutions to the aforementioned or other challenges. There are, proposed herein, various embodiments which address one or more of the issues disclosed herein. In one embodiment, a method performed by a network node of a cellular communication system to provide DCI-based TCI state update with flexible channel selection is provided. The method comprises transmitting, to a User Equipment (UE), a DCI, wherein a DCI format of the DCI comprises a TCI state update indication and a TCI state update application indication indicating one or more channels or signals to which the TCI state update is to be applied by the UE. In another embodiment, a method performed by a UE of a cellular communication system to provide DCI-based TCI state update with flexible channel selection is provided. The method comprises receiving, from a network node, a DCI, wherein a DCI format of the DCI comprises a TCI state update indication and a TCI state update application indication indicating one or more channels or signals to which the TCI state update is to be applied by the UE. The method further comprises applying the TCI state update as indicated by the TCI state update application indication.

Embodiments disclosed herein may provide one or more of the following technical advantage(s). In particular, a New Radio (NR) base station (gNB) can in an efficient and flexible way indicate if a DCI based TCI state update should be applied to one or multiple different channels/signals.

Before discussing methods and apparatus for providing DCI-based TCI state update with flexible channel selection in greater detail, exemplary cellular communications systems in which some embodiments of the present disclosure may be implemented are first discussed. In this regard, the following terms are defined:

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., an NR gNB in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a UE device in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a TCI state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 11:
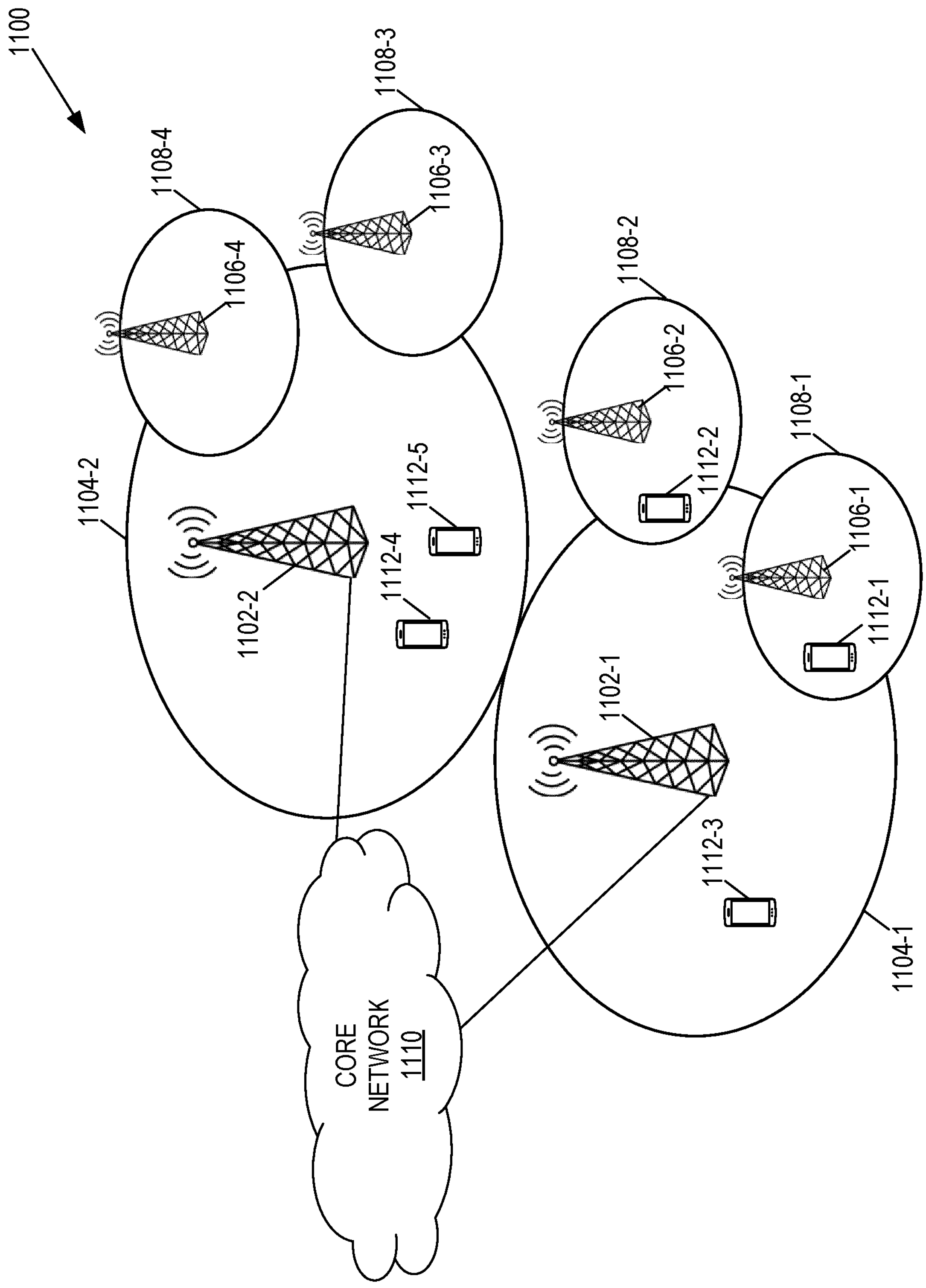
FIGS. 11 and 12 illustrate example embodiments in which the cellular communication system of FIG. 3 is a Fifth Generation (5G) System (5GS)

FIG. 11 illustrates one example of a cellular communications system 1100 in which embodiments of the present disclosure may be implemented. In the embodiments described herein, the cellular communications system 1100 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 1102-1 and 1102-2, which in the 5GS include NR gNBs and optionally next generation eNBs (ng-eNBs) (e.g., LTE RAN nodes connected to the 5GC) and in the EPS include eNBs, controlling corresponding (macro) cells 1104-1 and 1104-2. The base stations 1102-1 and 1102-2 are generally referred to herein collectively as base stations 1102 and individually as base station 1102. Likewise, the (macro) cells 1104-1 and 1104-2 are generally referred to herein collectively as (macro) cells 1104 and individually as (macro) cell 1104. The RAN may also include a number of low power nodes 1106-1 through 1106-4 controlling corresponding small cells 1108-1 through 1108-4. The low power nodes 1106-1 through 1106-4 can be small base stations (such as pico or femto base stations) or Remote Radio Heads (RRHs), or the like. Notably, while not illustrated, one or more of the small cells 1108-1 through 1108-4 may alternatively be provided by the base stations 1102. The low power nodes 1106-1 through 1106-4 are generally referred to herein collectively as low power nodes 1106 and individually as low power node 1106. Likewise, the small cells 1108-1 through 1108-4 are generally referred to herein collectively as small cells 1108 and individually as small cell 1108. The cellular communications system 1100 also includes a core network 1110, which in the 5GS is referred to as the 5GC. The base stations 1102 (and optionally the low power nodes 1106) are connected to the core network 1110.

The base stations 1102 and the low power nodes 1106 provide service to wireless communication devices 1112-1 through 1112-5 in the corresponding cells 1104 and 1108. The wireless communication devices 1112-1 through 1112-5 are generally referred to herein collectively as wireless communication devices 1112 and individually as wireless communication device 1112. In the following description, the wireless communication devices 1112 are oftentimes UEs, but the present disclosure is not limited thereto.

Figure 12:
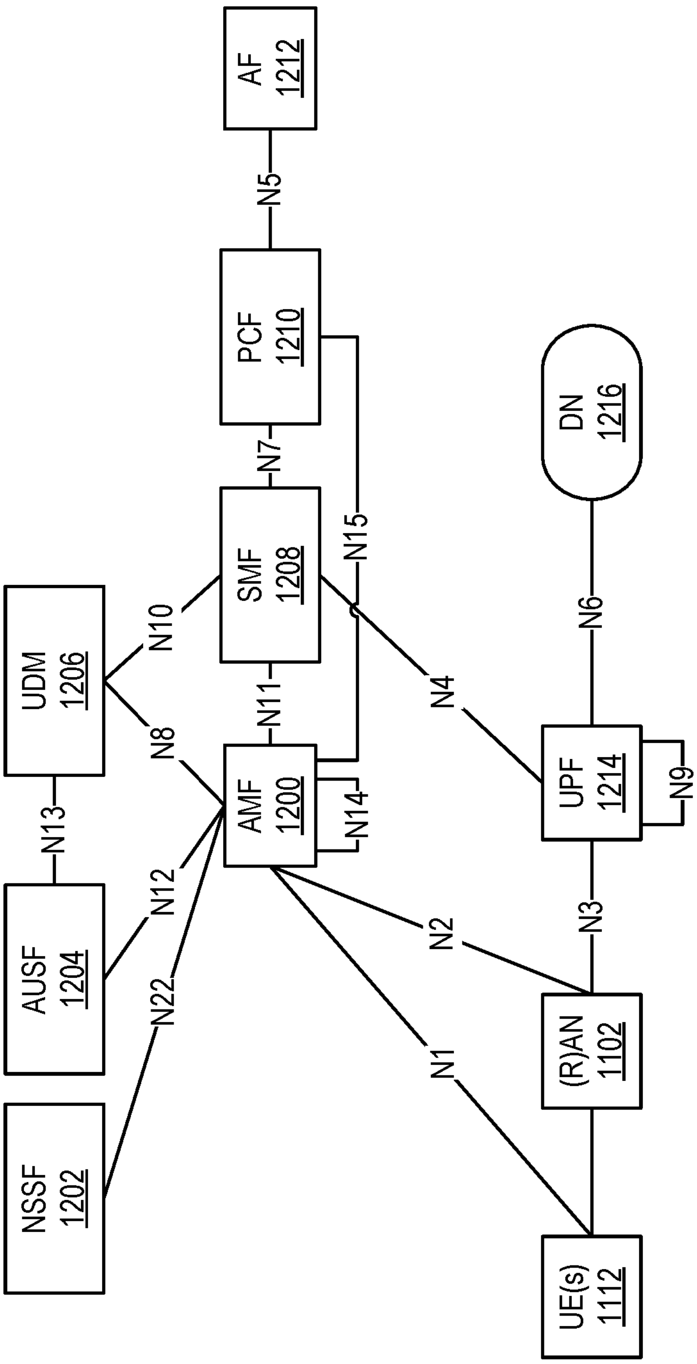

FIG. 12 illustrates a wireless communication system represented as a 5G network architecture composed of core Network Functions (NFs), where interaction between any two NFs is represented by a point-to-point reference point/interface. FIG. 12 can be viewed as one particular implementation of the system 1100 of FIG. 11.

Seen from the access side the 5G network architecture shown in FIG. 12 comprises a plurality of UEs 1112 connected to either a RAN 1102 or an Access Network (AN) as well as an AMF 1200. Typically, the RAN 1102 comprises base stations, e.g., such as eNBs or gNBs or similar. Seen from the core network side, the 5GC NFs shown in FIG. 12 include a NSSF 1202, an AUSF 1204, a UDM 1206, the AMF 1200, a SMF 1208, a PCF 1210, and an Application Function (AF) 1212.

Reference point representations of the 5G network architecture are used to develop detailed call flows in the normative standardization. The N1 reference point is defined to carry signaling between the UE 1112 and AMF 1200. The reference points for connecting between the AN 1102 and AMF 1200 and between the RAN 1102 and UPF 1214 are defined as N2 and N3, respectively. There is a reference point, N11, between the AMF 1200 and SMF 1208, which implies that the SMF 1208 is at least partly controlled by the AMF 1200. N4 is used by the SMF 1208 and UPF 1214 so that the UPF 1214 can be set using the control signal generated by the SMF 1208, and the UPF 1214 can report its state to the SMF 1208. N9 is the reference point for the connection between different UPFs 1214, and N14 is the reference point connecting between different AMFs 1200, respectively. N15 and N7 are defined since the PCF 1210 applies policy to the AMF 1200 and SMF 1208, respectively. N12 is required for the AMF 1200 to perform authentication of the UE 1112. N8 and N10 are defined because the subscription data of the UE 1112 is required for the AMF 1200 and SMF 1208.

The 5GC network aims at separating user plane (UP) and control plane (CP). The UP carries user traffic while the CP carries signaling in the network. In FIG. 12, the UPF 1214 is in the UP and all other NFs, i.e., the AMF 1200, SMF 1208, PCF 1210, AF 1212, NSSF 1202, AUSF 1204, and UDM 1206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RU) between UEs and a Data Network (DN) 1216 (which provides Internet access, operator services, and/or the like) for some applications requiring low latency.

The core 5G network architecture is composed of modularized functions. For example, the AMF 1200 and SMF 1208 are independent functions in the CP. Separated AMF 1200 and SMF 1208 allow independent evolution and scaling. Other CP functions like the PCF 1210 and AUSF 1204 can be separated as shown in FIG. 12. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 13:
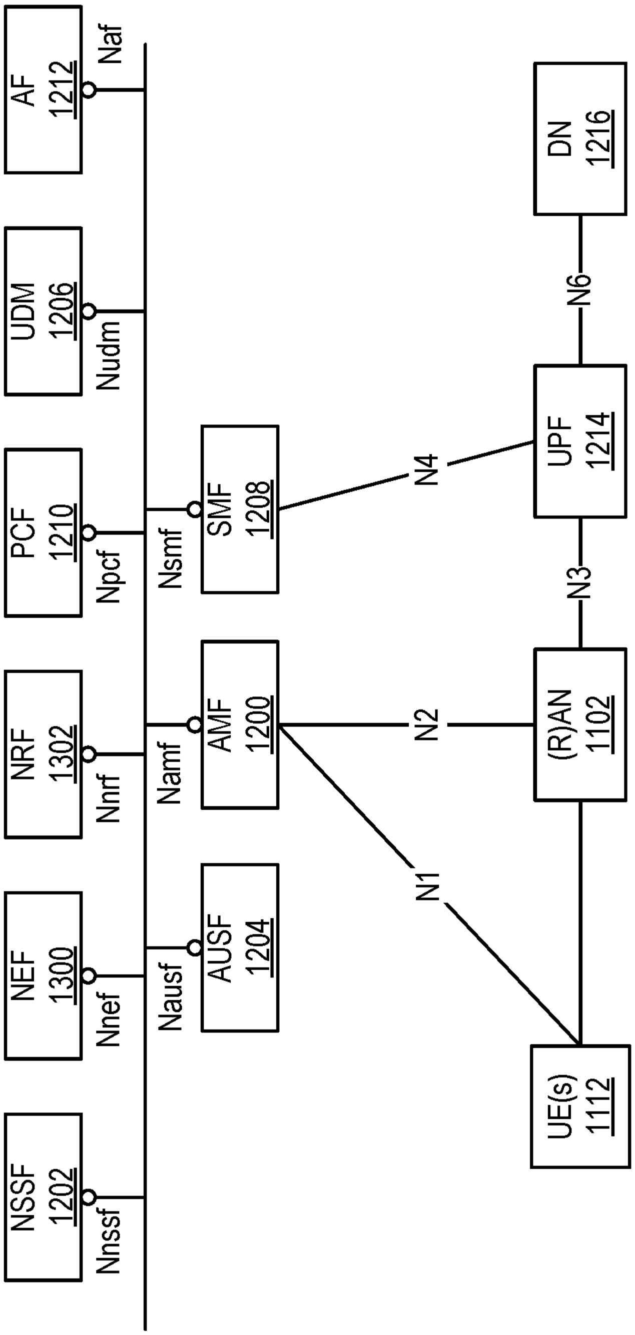
FIG. 13 illustrates an exemplary 5G network architecture using service-based interfaces between the network functions (NFs) in the control plane (CP)

FIG. 13 illustrates a 5G network architecture using service-based interfaces between the NFs in the CP, instead of the point-to-point reference points/interfaces used in the 5G network architecture of FIG. 12. However, the NFs described above with reference to FIG. 12 correspond to the NFs shown in FIG. 13. The service(s) etc. that a NF provides to other authorized NFs can be exposed to the authorized NFs through the service-based interface. In FIG. 13 the service based interfaces are indicated by the letter "N" followed by the name of the NF, e.g., Namf for the service based interface of the AMF 1200 and Nsmf for the service based interface of the SMF 1208, etc. The NEF 1300 and the NRF 1302 in FIG. 13 are not shown in FIG. 12 discussed above. However, it should be clarified that all NFs depicted in FIG. 12 can interact with the NEF 1300 and the NRF 1302 of FIG. 13 as necessary, though not explicitly indicated in FIG. 12.

Some properties of the NFs shown in FIGS. 12 and 13 may be described in the following manner. The AMF 1200 provides UE-based authentication, authorization, mobility management, etc. A UE 1112 even using multiple access technologies is basically connected to a single AMF 1200 because the AMF 1200 is independent of the access technologies. The SMF 1208 is responsible for session management and allocates Internet Protocol (IP) addresses to UEs. It also selects and controls the UPF 1214 for data transfer. If a UE 1112 has multiple sessions, different SMFs 1208 may be allocated to each session to manage them individually and possibly provide different functionalities per session. The AF 1212 provides information on the packet flow to the PCF 1210 responsible for policy control in order to support Quality of Service (QoS). Based on the information, the PCF 1210 determines policies about mobility and session management to make the AMF 1200 and SMF 1208 operate properly. The AUSF 1204 supports authentication function for UEs or similar and thus stores data for authentication of UEs or similar while the UDM 1206 stores subscription data of the UE 1112. The DN 1216, not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Embodiments for providing DCI-based TCI state update with flexible channel selection are now discussed. In particular, embodiments disclosed herein provide a DCI that includes a TCI state update application indication that specifies to which channels and signals a TCI state update is to be applied.

In a first embodiment, the TCI state update application indication comprises a new bitfield included in a DCI format (containing a TCI state update) that indicates which channels/signals (for example PDSCH/PDCCH/CSI-RS/PUCCH/PUSCH/SRS) the TCI state update should apply to. For example, assume a DCI Format 1_1 containing a TCI state update indication, also contains a new bitfield which can be used to indicate which channels/signals the TCI state update should be applied to. In one alternate of this embodiment, the new bitfield consists of a single bit, where a '0' indicates that the TCI state update only should be applied to the PDSCH/PUCCH/SRS triggered by the DCI, while if the new bitfield is '1' the TCI state update should be applied both to the triggered signals (PDSCH/PUCCH/SRS) and the PDCCH (CORESET carrying the DCI).

In one alternate of this embodiment, the new bitfield consists of more than one bit, and can be used to more explicitly determine which signals/channels the TCI state update should be applied to. For example, assume that the new bitfield consist of two bits (i.e., four codepoints). In this case the four different codepoints for example can indicate the four following indications:

'00': the TCI state update in the DCI should be applied only to the triggered signal (like for example PDSCH/PUCCH/SRS), '01': the TCI state update in the DCI should be applied only to the CORESET for which the DCI is conveyed in, '10', the TCI state in the DCI should be applied to all DL signals including them with periodic/semi-persistent time domain behavior (or a subset of all DL signals, where the UE has been pre-configured with information about which of the DL signals that it should be applied to), '11': the TCI state update in the DCI should be applied to all UL signals including them with periodic/semi-persistent time domain behavior (or a subset of all UL signals, where the UE has been pre-configured with information about which of the DL signals that it should be applied to).

In case one TCI bitfield is included in the DCI that points to two (2) TCI states (one (1) for DL channels and one (1) for UL channels), the new bitfield is always associated with the TCI state aimed for DL signals since PDCCH is a DL signal. That is, if a codepoint in the TCI bitfield is mapped to two TCI states, in one embodiment, then:

the first TCI state indicated may apply to downlink channels/signals (e.g., PDSCH/PDCCH/CSI-RS and other downlink reference signals), and the second TCI state indicated may apply to uplink channels/signals (e.g., PUSCH/PUCCH/SRS and other uplink reference signals).

Although the above embodiments mainly are written from the perspective of applying the indicated TCI state to the triggered channels/signals, the above embodiment is equally applicable to non-triggered channels/signals as well. For instance, in one example embodiment, when a new bitfield is included in a DCI format, this bitfield indicates if a TCI state indicated in the TCI bitfield in DCI should be applied to only the triggered channels/signals (e.g., PDSCH/PUCCH/PUSCH/SRS) or both triggered and non-triggered channels/signals (e.g., periodic or semi-persistent PUCCH, periodic CSI-RS/TRS, semi-persistent CSI-RS).

In a second embodiment, the TCI state update application indication comprises different RNTIs of a DCI format that are used to which channels/signals the TCI state update indicated in the DCI should be applied to. In some examples of this embodiment, three (3) different RNTIs are specified for DCI carrying a TCI state update, where the different RNTIs indicate to the UE the following:

RNTI_1: The TCI state update in the DCI should be applied only to the triggered signal (like for example PDSCH/PUCCH/SRS), RNTI_2: The TCI state update in the DCI should only be applied to the CORESET for which the DCI is conveyed in, RNTI_3: The TCI state update in the DCI should be applied to all or subset of all DL (and/or UL) signals (aperiodic/triggered and/or semi-persistent/periodic).

The new RNTI(s) can either be designed for an existing DCI Format, or for a new DCI Format.

In a third embodiment, the TCI state update application indication comprises a new RRC configured parameter that is used to indicate to the UE which channels/signals the TCI state update in the DCI should be applied to (which can be both un-triggered and/or triggered signal/channels).

In some examples of this embodiment, the RRC configuration indicates that a DCI based TCI state update may apply to PUCCH and PUSCH and all DL channels but not SRS. In yet another example, the higher layer configuration may contain information about which PUCCH resource/PUCCH resource groups the TCI state update should be applied to. This may for example follow the existing PUCCH-ResourceGroup IE in 3GPP TS 38.331 or another list or group of PUCCH resources.

In some examples of this embodiment, the TCI state update is applied to different signals/channels for different DCI formats. For example, a TCI state update in DCI format 0_1 may be applied to SRS and PUSCH, while the TCI state update in DCI format 1_1 may be applied to PDSCH and PDCCH.

In yet another embodiment, the RRC configured list contains a list of CORESET to which the new TCI state update should be applied. Alternatively, the RRC configuration may contain the CORESET pool index (e.g., an index of a group of CORESETs) to which the new TCI state should be applied.

In one option, the new parameter is configured in the 'PDSCH-Config' information element (IE). In this case, the parameter should be applied to all the CORESETs belonging to the cell and BWP that the 'PDSCH-Config' is configured for. In another option, the parameter is configured per each CORESET (i.e., in the ControlResourceSet). In this case, different settings can be used for different CORESETs. In another option different configuration is applied to different lists of CORESETs. These may follow the existing CORESETPoolIndex in 3GPP TS 38.331 such that all CORESETS configured with one CORESETPoolIndex value follow the same configuration. In this case the new parameter is configured in PDCCH-Config and associated with the CORESETPoolIndex. In this way configuration per TRP may be controlled where one CORESETPoolIndex is associated with one TRP. In another option, new lists for CORESET are added to RRC and the configuration applies per list of CORESETs.

In some other embodiments, this parameter is configured per serving cell such that all BWPs of a configured serving cell follow the same configuration. In another option, the configuration is applied to a list of serving cells. This may use one of the existing lists of serving cells in 3GPP TS 38.331 or a new list.

In a fourth embodiment, when a Configured Grant (CG) transmission is activated by a DCI indicating more than one UL TCI states associated with the PUSCH transmission, the UE may transmit the CG PUSCH with one of the indicated UL TCI only if the measurement based on the associated DL-RS for the UL TCI satisfies certain measurement criteria. The measurement criteria can be for example a threshold value for RSRP or SINR measurement, or for example a time duration during which the measurement satisfies the threshold requirement. In case all TCIs being configured to the CG satisfies the criteria, UE may transmit the CG PUSCH with the TCI with lowest configure index or transmit with CG with highest/best measurement results. The measurement criteria and rules for selecting the TCI when more than one TCI fulfill the requirement can be configured separately in ConfiguredGrantConfig.

In a fifth embodiment, the TCI state indicated in DCI is applied to all DL and UL channels being configured to the UE as well as path loss reference signals allowing the gNB to update one single TCI state in a DCI when the UE moves around in a cell (note that some signals may still be exempted from this common TCI state update, like for example periodic TRS, aperiodic CSI-RS where the spatial QCL instead may be configured in the aperiodic trigger state IE).This embodiment could be beneficial for example, in case the UE is located on a high speed train etc., and one would like to have a very quick overhead efficient beam switching procedure.

In one alternate of this embodiment, a UE is configured with a single CORESET and it may be desirable to use the same gNB beam for all DL and UL channels (for example, path loss reference signal/PDSCH/PDCCH/SRS/PUSCH/PUCCH). In a similar way as the "3-stage indication of TCI state" as described above, a list of TCI states is activated, and each activated TCI state is mapped to a codepoint. The gNB can then signal the codepoint in DCI to select one of the active TCI states. The UE should then use the active TCI state as QCL source for all DL and UL signals, like for example PDCCH/PDSCH/periodic/semi-persistent CSI-RS for CSI acquisition, path loss RS for all UL signals (SRS/PUSCH/PUCCH/and CG).

In one alternate of this embodiment, a UE is configured with carrier aggregation using multiple serving cells from the same TRP. In this case it would be beneficial (in terms of overhead) if the gNB could update the TCI states for all DL and UL signals for all serving cells with a single DCI message. In one alternate of this embodiment this is done by configuring in RRC which serving cells a TCI state update should apply to. Note that, this may reuse one of the existing lists of serving cells in IE CellGroupConfig such as simultaneousTCI-UpdateList1 simultaneousTCI-UpdateList2 (as defined in 3GPP TS 38.331) or a new list may be defined. For example, the gNB configures the UE with a list of serving cells, where if the TCI state is updated for one of the serving cells, the same update is applied to all serving cells in that list.

In one alternate of this embodiment the UE is configured with two CORESETs each with a different CORESETPoolIndex. In this case a DCI containing a codepoint for TCI state update transmitted in a CORESET associated with a first CORESETPoolIndex will update the TCI state of that CORESET and all DL/UL signals later trigger by DCIs using that CORESET. In this way, it is possible to have a common DCI based TCI state update per TRP. Note that for periodic/semi-persistent signals, like periodic SRS, configured grant etc., where the actual transmission is not triggered by a DCI, some explicit rules might be needed to indicate which CORESET they should be associated with (and hence which TCI state update they should follow). One way to solve this is to configure these signals with a CORESETPoolIndex. For example, a new variable in an SRS resource set/configured grant configuration could include the CORESETPoolIndex which then would indicate which CORESET and hence which TCI state they should be associated with.

In a sixth embodiment, the TCI state indicated in a first DCI (e.g., a downlink DCI format) is applied to all DL channels/signals, while the TCI state indicated in a second DCI (e.g., an uplink DCI format) is applied to all UL channels/signals.

Figure 14:
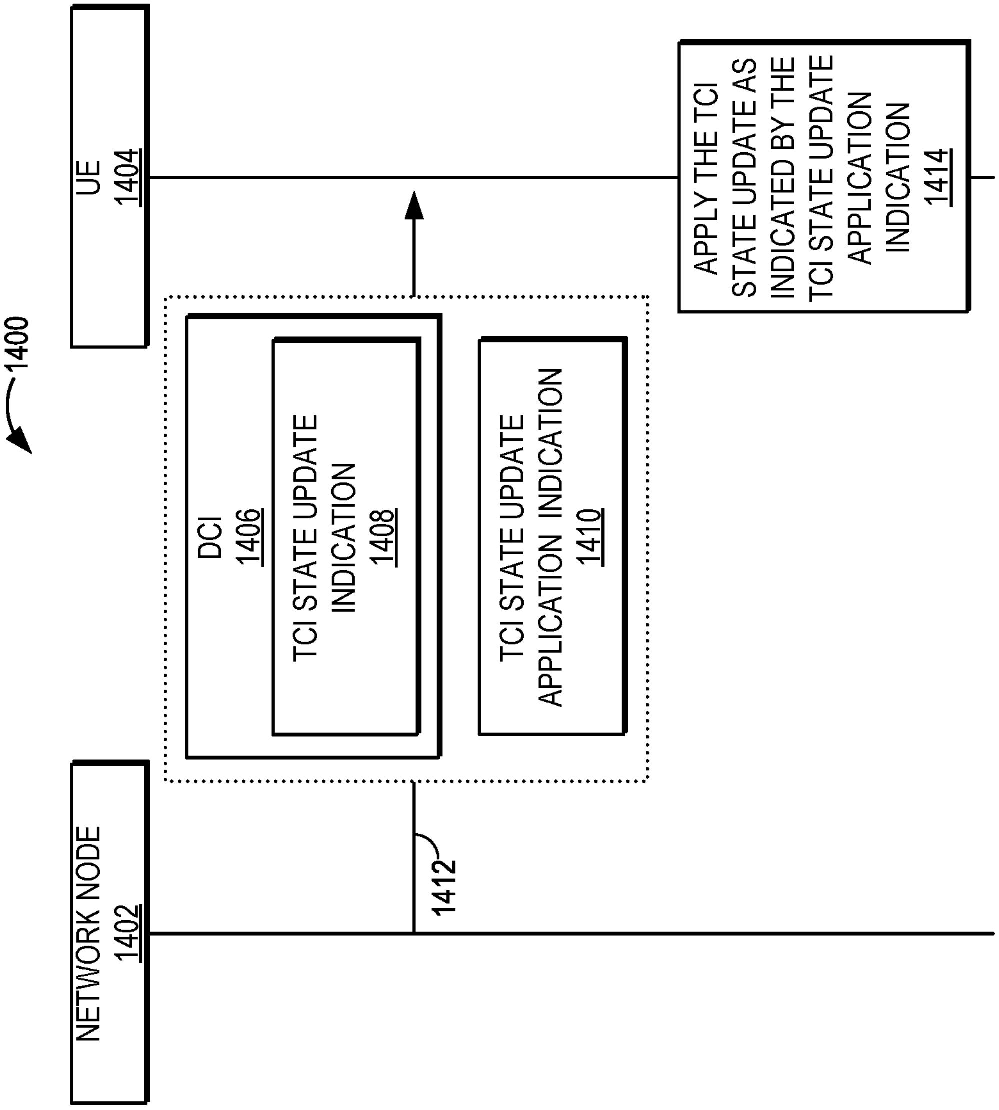
FIG. 14 illustrates exemplary communication flows and operations for providing Downlink Control Information (DCI)-based TCI state update with flexible channel selection, according to some embodiments disclosed herein.

To illustrate DCI, FIG. 14 provides a message flow diagram 1400. As seen in FIG. 14, the message flow diagram 1400 show a network node 1402 (such as, e.g., a base station 1102 or 1106 or a network node that implements all or part of the functionality of the base station 1102 or 1106) and a UE 1404 represented by vertical lines, with communications between these elements represented by captioned arrows and operations performed by these elements represented by captioned blocks. In FIG. 14, operations begin with the network node 1402 transmitting a DCI 1406 and a TCI state update application indication 1410 to the UE 1404, as indicated by arrow 1412. The DCI 1406 includes a TCI state update indication 1408, while the TCI state update application indication 1410 indicates one or more channels or signals to which the TCI state update is to be applied by the UE. The UE 1404, upon receiving the DCI 1406, applies the TCI state update as indicated by the TCI state update application indication 1410, as indicated by block 1414.

Figure 15:
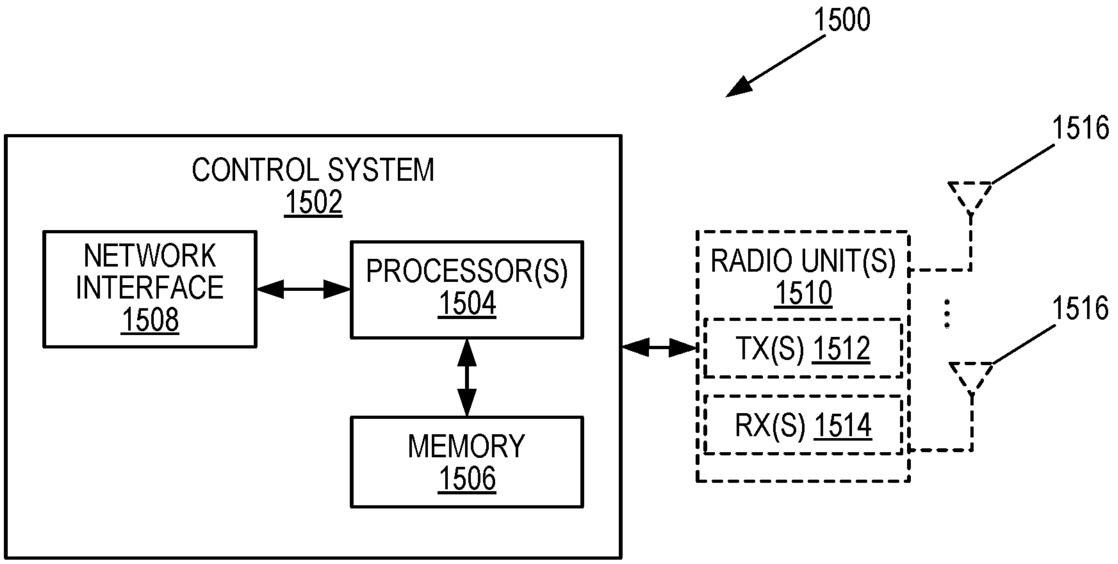
FIG. 15 is a schematic block diagram of a radio access node according to some embodiments disclosed herein.

FIG. 15 is a schematic block diagram of a network node 1500 (such as the network node 1402 of FIG. 14) according to some embodiments disclosed herein. Optional features are represented by dashed boxes. The network node 1500 may be, for example, a base station 1102 or 1106 or a network node that implements all or part of the functionality of the base station 1102 or gNB described herein. As illustrated, the network node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the network node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a network node 1500 as described herein. In some embodiments, the function(s) are implemented in software that is stored, e.g., in the memory 1506 and executed by the one or more processors 1504.

Figure 16:
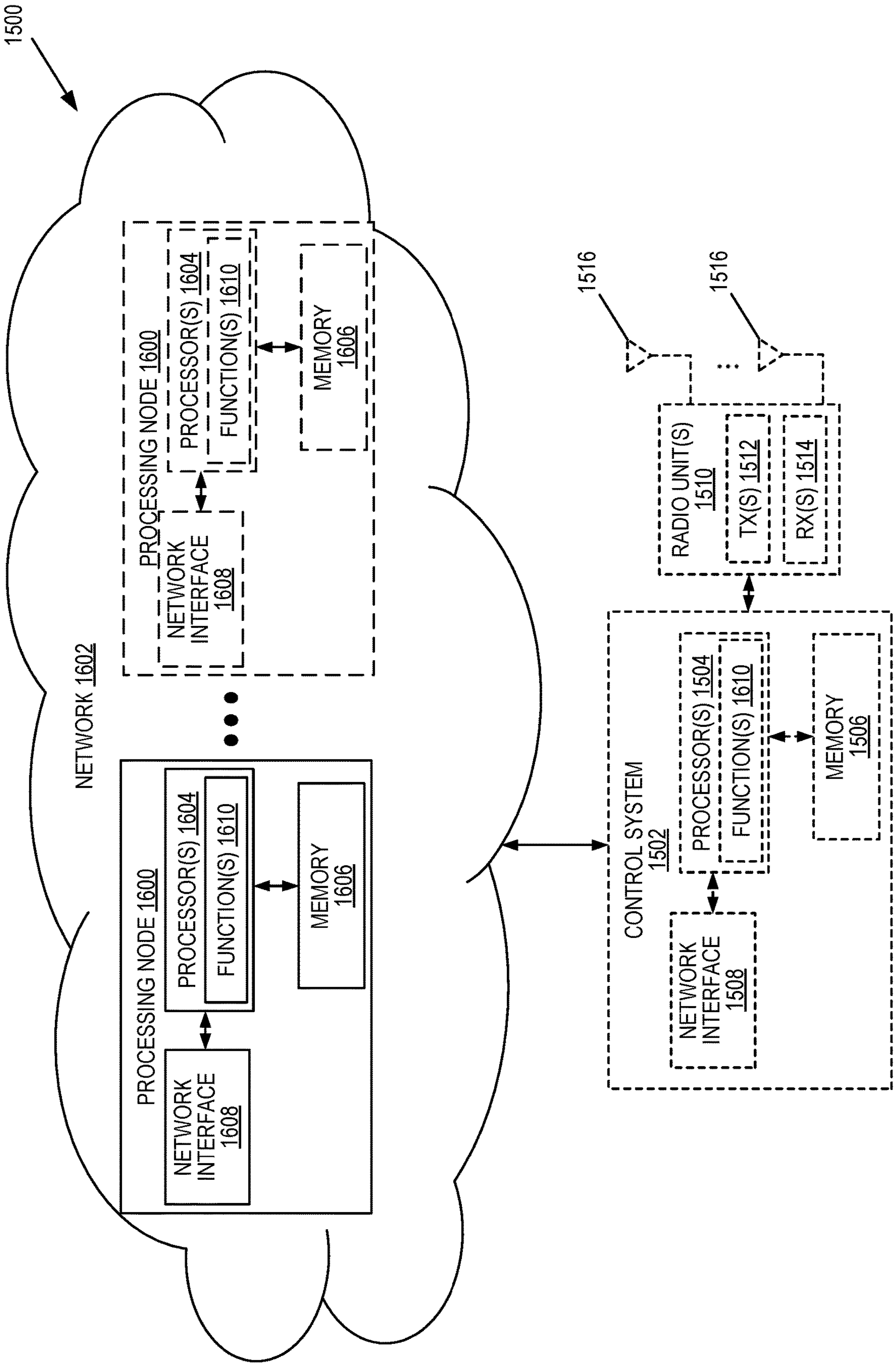
FIG. 16 is a schematic block diagram that illustrates a virtualized embodiment of the radio access node of FIG. 15 according to some embodiments disclosed herein.

FIG. 16 is a schematic block diagram that illustrates a virtualized embodiment of the network node 1500 according to some embodiments disclosed herein. This discussion is equally applicable to other types of network nodes. Further, other types of network nodes may have similar virtualized architectures. Again, optional features are represented by dashed boxes.

As used herein, a "virtualized" radio access node is an implementation of the network node 1500 in which at least a portion of the functionality of the network node 1500 is implemented as a virtual component(s) (e.g., via a virtual machine(s) executing on a physical processing node(s) in a network(s)). As illustrated, in this example, the network node 1500 may include the control system 1502 and/or the one or more radio units 1510, as described above. The control system 1502 may be connected to the radio unit(s) 1510 via, for example, an optical cable or the like. The network node 1500 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICs, FPGAs, and/or the like), memory 1606, and a network interface 1608.

In this example, functions 1610 of the network node 1500 described herein are implemented at the one or more processing nodes 1600 or distributed across the one or more processing nodes 1600 and the control system 1502 and/or the radio unit(s) 1510 in any desired manner. In some particular embodiments, some or all of the functions 1610 of the network node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of network node 1500 or a node (e.g., a processing node 1600) implementing one or more of the functions 1610 of the network node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
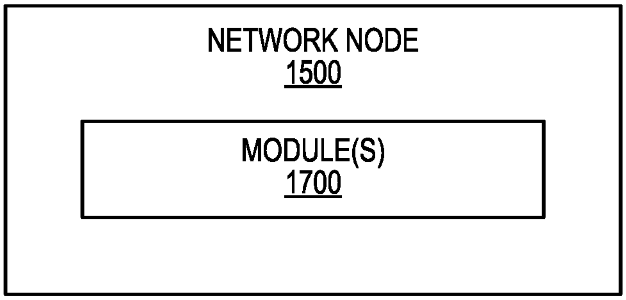
FIG. 17 is a schematic block diagram of the radio access node of FIG. 15 according to some other embodiments disclosed herein.

FIG. 17 is a schematic block diagram of the network node 1500 according to some other embodiments of the present disclosure. The network node 1500 includes one or more modules 1700, each of which is implemented in software. The module(s) 1700 provide the functionality of the network node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
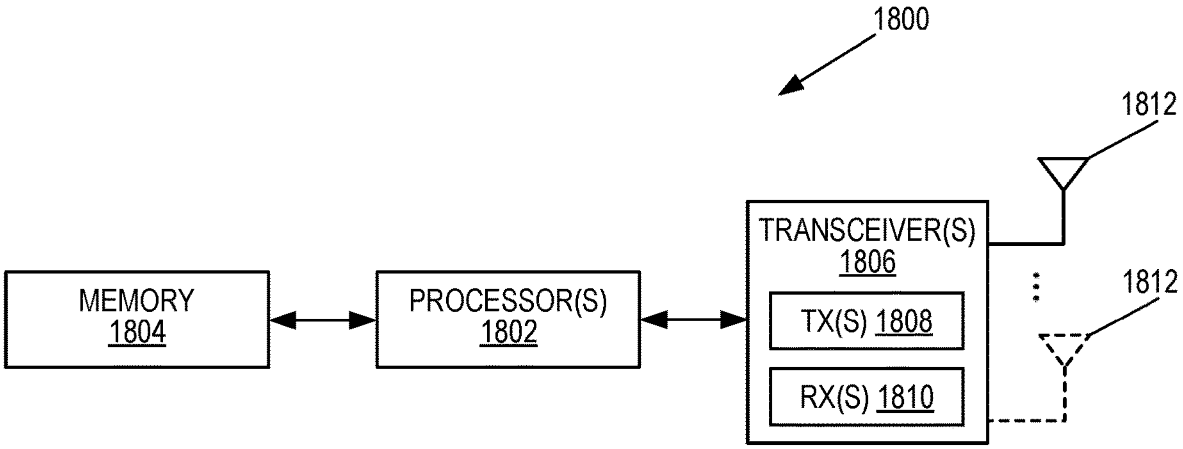
FIG. 18 is a schematic block diagram of a UE according to some embodiments disclosed herein.

FIG. 18 is a schematic block diagram of a wireless communication device ("UE") 1800 (e.g., the UE 1404 of FIG. 14) according to some embodiments disclosed herein. As illustrated, the wireless communication device 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the wireless communication device 1800 described above may be fully or partially implemented in software that is, e.g., stored in the memory 1804 and executed by the processor(s) 1802. Note that the wireless communication device 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the wireless communication device 1800 and/or allowing output of information from the wireless communication device 1800), a power supply (e.g., a battery and associated power circuitry), etc.

In some embodiments, a computer program including instructions which, when executed by at least one processor, causes the at least one processor to carry out the functionality of the wireless communication device 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
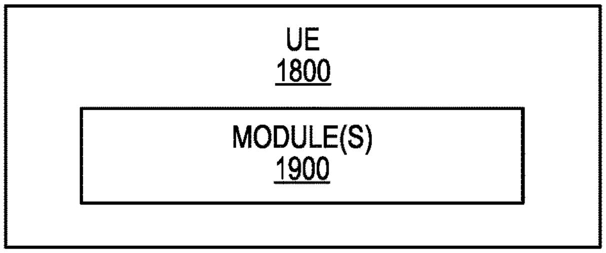
FIG. 19 is a schematic block diagram of the UE of FIG. 18 according to some other embodiments disclosed herein.

FIG. 19 is a schematic block diagram of the wireless communication device 1800 according to some other embodiments of the present disclosure. The wireless communication device 1800 includes one or more modules 1900, each of which is implemented in software. The module(s) 1900 provide the functionality of the wireless communication device 1800 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1: A method performed by a network node of a cellular communication system to provide Downlink Control Information (DCI)-based Transmission Configuration Indicator (TCI) state update with flexible channel selection, the method comprising transmitting, to a User Equipment (UE), a DCI, wherein a DCI format of the DCI comprises:

- a TCI state update indication; and
- a TCI state update application indication indicating one or more channels or signals to which the TCI state update is to be applied by the UE.

Embodiment 2: A method performed by a User Equipment (UE) of a cellular communication system to provide Downlink Control Information (DCI)-based Transmission Configuration Indicator (TCI) state update with flexible channel selection, the method comprising:

- receiving, from a network node, a DCI, wherein a DCI format of the DCI comprises:
- a TCI state update indication; and
- a TCI state update application indication indicating one or more channels or signals to which the TCI state update is to be applied by the UE; and
- applying the TCI state update as indicated by the TCI state update application indication.

Embodiment 3: The method of any one of embodiments 1 and 2, wherein the TCU state update application indication comprises a bitfield within the DCI.

Embodiment 4: The method of embodiment 3, wherein:

- the bitfield comprises one (1) bit;
- a value of zero (0) stored in the bitfield indicates that the TCI state update should only be applied to a physical data channel (PDSCH), a physical uplink control channel (PUCCH), or a sounding reference signal (SRS) triggered by the DCI; and
- a value of one (1) stored in the bitfield indicates that the TCI state update should be applied both to the PDSCH, the PUCCH, or the SRS triggered by the DCI, and to a physical downlink control channel (PDCCH).

Embodiment 5: The method of embodiment 3, wherein the bitfield comprises a plurality of bits.

Embodiment 6: The method of embodiment 5, wherein:

- the bitfield comprises two (2) bits;
- a value of zero (0) stored in the bitfield indicates that the TCI state update should be applied only to a physical data channel (PDSCH), a physical uplink control channel (PUCCH), or a sounding reference signal (SRS) triggered by the DCI;
- a value of zero (1) stored in the bitfield indicates that the TCI state update should be applied only to a physical downlink control channel (PDCCH);
- a value of zero (2) stored in the bitfield indicates that the TCI state update should be applied to all downlink (DL) signals; and
- a value of zero (3) stored in the bitfield indicates that the TCI state update should be applied to all uplink (UL) signals.

Embodiment 7: The method of embodiment 3, wherein:

- the TCI state update indication points to two TCI states comprising a TCI state for downlink (DL) channels and a TCI state for uplink (UL) channels; and
- the bitfield is associated with the TCI state for DL channels.

Embodiment 8: The method of any one of embodiments 1 and 2, wherein the TCU state update application indication comprises one or more Radio Network Temporary Identifiers (RNTIs) within the DCI.

Embodiment 9: The method of embodiment 8, wherein:

- a first RNTI of the one or more RNTIs indicates that the TCI state update should be applied only to physical data channel (PDSCH), a physical uplink control channel (PUCCH), or a sounding reference signal (SRS) triggered by the DCI;
- a second RNTI of the one or more RNTIs indicates that the TCI state update should be applied only to a physical downlink control channel (PDCCH); and
- a third RNTI of the one or more RNTIs indicates that the TCI state update should be applied to all downlink (DL) signals, a subset of all DL signals, all uplink (UL) signals, or a subset of all UL signals.

Embodiment 10: The method of any one of embodiments 1 and 2, wherein the TCU state update application indication comprises a Radio Resource Control (RRC) parameter.

Embodiment 11: The method of embodiment 10, wherein the TCU state update indicated in the DCI is applied to all downlink (DL) and uplink (UL) channels being configured by the UE, and to path loss reference signals.

Embodiment 12: The method of any one of embodiments 1 and 2, wherein:

the DCI format comprises a downlink (DL) DCI format; and the TCU state update is applied to all DL channels or signals.

Embodiment 13: The method of any one of embodiments 1 and 2, wherein:

the DCI format comprises an uplink (UL) DCI format; and the TCU state update is applied to all UL channels or signals.

Embodiment 14: A network node for a core network of a cellular communications system where the network node is enabled to provide Downlink Control Information (DCI)-based Transmission Configuration Indicator (TCI) state update with flexible channel selection, the network node comprising:

a network interface; and processing circuitry associated with the network interface, the processing circuitry configured to cause the network node to transmit, to a User Equipment (UE), a DCI, wherein a DCI format of the DCI comprises:

a TCI state update indication; and a TCI state update application indication indicating one or more channels or signals to which the TCI state update is to be applied by the UE.

Embodiment 15: A User Equipment (UE), comprising:

one or more transmitters;

one or more receivers; and processing circuitry associated with the one or more transmitters and the one or more receivers, the processing circuitry configured to cause the wireless device to:

receive, from a network node, a Downlink Control Information (DCI), wherein a DCI format of the DCI comprises:

a TCI state update indication; and a TCI state update application indication indicating one or more channels or signals to which a TCI state update is to be applied by the UE; and apply the TCI state update as indicated by the TCI state update application indication.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
ASIC Application Specific Integrated Circuit
AUSF Authentication Server Function
BW Bandwidth
BWP Bandwidth Part
CE Control Element
CG Configured Grant
CP-OFDM Cyclic Prefix Orthogonal Frequency Division Multiplexing
CORESET Control Resource Set
CPU Central Processing Unit
CRB Common Resource Block
CSI-RS Channel State Information Reference Signal
CSS Common Search Space
DCI Downlink Control Information
DFT Discrete Fourier Transform
DFT-S-OFDM Discrete Fourier Transform-Spread Orthogonal Frequency Division Multiplexing
DL Downlink
DN Data Network
DSP Digital Signal Processor
eNB Enhanced or Evolved Node B
EPC Evolved Packet Core
EPS Evolved Packet System
E-UTRAN Evolved Universal Terrestrial Radio Access Network
FPGA Field Programmable Gate Array
gNB New Radio Base Station
gNB-CU New Radio Base Station Central Unit
gNB-DU New Radio Base Station Distributed Unit
HSS Home Subscriber Server
IE Information Element
IoT Internet of Things
ID Identity
IP Internet Protocol
LCID Logical Channel Identity
LTE Long Term Evolution
MAC Medium Access Control
MME Mobility Management Entity
MTC Machine Type Communication
NEF Network Exposure Function
NF Network Function
NG-RAN Next Generation Radio Access Network
NR New Radio
NRF Network Function Repository Function
NSSF Network Slice Selection Function
OFDM Orthogonal Frequency Division Multiplexing
PBCH Physical Broadcast Channel
PC Personal Computer
PCF Policy Control Function
PDCCH Physical Downlink Control Channel
PDCH Physical Data Channel
PDSCH Physical Downlink Shared Channel
P-GW Packet Data Network Gateway
PUSCH Physical Uplink Shared Channel
QCL Quasi Co-Located
RAM Random Access Memory
RAN Radio Access Network
RB Resource Block
RE Resource Element
RF Radio Frequency
RNTI Radio Network Temporary Identifier
ROM Read Only Memory
RRC Radio Resource Control
RRH Remote Radio Head
RS Reference Signal
RTT Round Trip Time
Rx Receiver
SCEF Service Capability Exposure Function
SMF Session Management Function
SRI Sounding Reference Signal Resource Indicator
SRS Sounding Reference Signal
SS Synchronization Signal
TCI Transmission Configuration Indicator TRP Transmission Point
TRS Tracking Reference Signal
Tx Transmission
UDM Unified Data Management
UE User Equipment
USS User Equipment-Specific Search Space
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. A method performed by a network node of a cellular communication system to provide Downlink Control Information, DCI,-based Transmission Configuration Indicator, TCI, state update with flexible channel selection, the method comprising transmitting, to a User Equipment, UE, a DCI, wherein a DCI format of the DCI comprises a TCI state update indication, and a TCI state update application indication indicating one or more channels or signals to which the TCI state update is to be applied by the UE, and wherein at least one of A), B), C), D), E), and F) is true:

A) the TCI state update application indication comprises a bitfield within the DCI, and wherein:
the bitfield comprises one bit;
a first codepoint of the bitfield indicates that the TCI state update should only be applied to one or more of a physical downlink shared channel, PDSCH, a physical uplink control channel, PUCCH, and a sounding reference signal, SRS, triggered by the DCI; and
a second codepoint of the bitfield indicates that the TCI state update should be applied to one or more of the PDSCH, the PUCCH, and the SRS triggered by the DCI, and to a physical downlink control channel, PDCCH, and other channels or signals not triggered by the DCI; or B) the TCI state update application indication comprises a bitfield within the DCI, and wherein:
the bitfield comprises a plurality of bits;
the first codepoint of the bitfield indicates that the TCI state update should be applied only to the PDSCH, the PUCCH, or the SRS, triggered by the DCI;
the second codepoint of the bitfield indicates that the TCI state update should be applied only to the PDCCH;
a third codepoint of the bitfield indicates that the TCI state update should be applied to all downlink, DL, signals; and
a fourth codepoint of the bitfield indicates that the TCI state update should be applied to all uplink, UL, signals; or C) the TCI state update application indication comprises a bitfield within the DCI, and wherein the TCI state update application indication comprises a bitfield within the DCI, and wherein a codepoint of the TCI state update indication points to two TCI states comprising a TCI state for DL channels and a TCI state for UL channels; or D) the TCI state update application indication comprises using one of a plurality of Radio Network Temporary Identifiers (RNTIs) to scramble a cyclic redundancy check (CRC) of the DCI and wherein:
a first RNTI of the plurality of RNTIs indicates that the TCI state update should be applied only to the PDSCH, the PUCCH, or the SRS triggered by the DCI;
a second RNTI of the plurality of RNTIs indicates that the TCI state update should be applied only to a control resource set, CORESET, in which the DCI is conveyed; and
a third RNTI of the plurality of RNTIs indicates that the TCI state update should be applied to all DL signals, a subset of all DL signals, all UL signals, or a subset of all UL signals; or E) wherein the TCI state update application indication comprises a Radio Resource Control, RRC, configured parameter and wherein:
the TCI state update indicated in the DCI is applied to the PUCCH, and the PUSCH, and all the DL channels, but is not applied to the SRS;
wherein the RRC configured parameter indicates to which a PUCCH resource and/or a PUCCH resource group the TCI state update indicated in the DCI is applied;
wherein the RRC configured parameter comprises a list of CORESETs, to which the TCI state update indicated in the DCI is applied;
wherein the RRC configured parameter comprises a CORESET pool index to which the TCI state update indicated in the DCI is applied;
wherein the RRC configured parameter is configured in a PDSCH Config information element, IE;
wherein the RRC configured parameter is configured per serving cell, such that all bandwidth parts, BWPs, of a configured serving cell follow a same configuration;
wherein the RRC configured parameter is configured for a list of serving cells;
wherein:
the UE is configured with a single CORESET;
a list of TCI states is activated, with each activated TCI state mapped to a codepoint; and
the DCI comprises an indication from the network node signaling the codepoint to select one of the activated TCI states for use by the UE as a quasi-co-located, QCL, source for all DL and UL signals;
wherein:
the UE is configured with two control resource sets, CORESETs, each with a different CORESET-PoolIndex;
the DCI comprises a codepoint for the TCI state update indication transmitted in a CORESET associated with a first CORESETPoolIndex; and
the DCI updates a TCI state of the CORESET and all DL and UL signals later triggered by a subsequent DCI transmitted in the CORESET; or F) wherein the TCI state update indicated in the DCI is applied to different signals and/or different channels corresponding to different DCI formats of the DCI and wherein:
a TCI state update in DCI format 0_1 is applied to the SRS and the PUSCH; and
a TCI state update in DCI format 1_1 is applied to the PDSCH, and the PDCCH.

2. The method of claim 1, wherein:
the DCI format comprises DL DCI format; and
the TCI state update is applied to all the DL channels or signals.

3. The method of claim 1, wherein:

the DCI format comprises a UL DCI format; and the TCI state update is applied to all the UL channels or signals.

4. A network node for a core network of a cellular communications system where the network node is enabled to provide Downlink Control Information, DCI,-based Transmission Configuration Indicator, TCI, state update with flexible channel selection, the network node comprising:

a network interface; and processing circuitry associated with the network interface, the processing circuitry configured to cause the network node to transmit, to a User Equipment, UE, a DCI, wherein a DCI format of the DCI comprises a TCI state update indication, and a TCI state update application indication indicating one or more channels or signals to which the TCI state update is to be applied by the UE, and wherein at least one of A), B), C), D), E), and F) is true:

A) the TCI state update application indication comprises a bitfield within the DCI, and wherein:

the bitfield comprises one bit;

a first codepoint of the bitfield indicates that the TCI state update should only be applied to one or more of a physical downlink shared channel, PDSCH, a physical uplink control channel, PUCCH, and a sounding reference signal, SRS, triggered by the DCI; and a second codepoint of the bitfield indicates that the TCI state update should be applied to one or more of the PDSCH, the PUCCH, and the SRS triggered by the DCI, and to a physical downlink control channel, PDCCH, and other channels or signals not triggered by the DCI; or B) the TCI state update application indication comprises a bitfield within the DCI, and wherein:

the bitfield comprises a plurality of bits;

the first codepoint of the bitfield indicates that the TCI state update should be applied only to the PDSCH, the PUCCH, or the SRS, triggered by the DCI;

the second codepoint of the bitfield indicates that the TCI state update should be applied only to the PDCCH;

a third codepoint of the bitfield indicates that the TCI state update should be applied to all downlink, DL, signals; and a fourth codepoint of the bitfield indicates that the TCI state update should be applied to all uplink, UL, signals; or C) the TCI state update application indication comprises a bitfield within the DCI, and wherein the TCI state update application indication comprises a bitfield within the DCI, and wherein a codepoint of the TCI state update indication points to two TCI states comprising a TCI state for DL channels and a TCI state for UL channels; or D) the TCI state update application indication comprises using one of a plurality of Radio Network Temporary Identifiers (RNTIs) to scramble a cyclic redundancy check (CRC) of the DCI and wherein:

a first RNTI of the plurality of RNTIs indicates that the TCI state update should be applied only to a physical downlink shared channel, PDSCH, a physical uplink control channel, PUCCH, or a sounding reference signal, SRS, triggered by the DCI;

a second RNTI of the plurality of RNTIs indicates that the TCI state update should be applied only to a control resource set, CORESET, in which the DCI is conveyed; and a third RNTI of the plurality of RNTIs indicates that the TCI state update should be applied to all downlink, DL, signals, a subset of all DL signals, all UL signals, or a subset of all UL signals; or E) wherein the TCI state update application indication comprises a Radio Resource Control, RRC, configured parameter and wherein:

the TCI state update indicated in the DCI is applied to the PUCCH, and the PUSCH, and all the DL channels, but is not applied to the SRS;

wherein the RRC configured parameter indicates to which a PUCCH resource and/or a PUCCH resource group the TCI state update indicated in the DCI is applied;

wherein the RRC configured parameter comprises a list of CORESETs, to which the TCI state update indicated in the DCI is applied;

wherein the RRC configured parameter comprises a CORESET pool index to which the TCI state update indicated in the DCI is applied;

wherein the RRC configured parameter is configured in a PDSCH Config information element, IE;

wherein the RRC configured parameter is configured per serving cell, such that all bandwidth parts, BWPs, of a configured serving cell follow a same configuration;

wherein the RRC configured parameter is configured for a list of serving cells;

wherein:

the UE is configured with a single CORESET;

a list of TCI states is activated, with each activated TCI state mapped to a codepoint; and the DCI comprises an indication from the network node signaling the codepoint to select one of the activated TCI states for use by the UE as a quasi-co-located, QCL, source for all DL and UL signals;

wherein:

the UE is configured with two control resource sets, CORESETs, each with a different CORESETPoolIndex;

the DCI comprises a codepoint for the TCI state update indication transmitted in a CORESET associated with a first CORESETPoolIndex; and the DCI updates a TCI state of the CORESET and all DL and UL signals later triggered by a subsequent DCI transmitted in the CORESET; or F) wherein the TCI state update indicated in the DCI is applied to different signals and/or different channels corresponding to different DCI formats of the DCI and wherein:

a TCI state update in DCI format 0_1 is applied to a sounding reference signal, SRS, and a physical uplink shared channel, PUSCH; and a TCI state update in DCI format 1_1 is applied to the PDSCH, and the PDCCH.

5. A method performed by a User Equipment, UE, of a cellular communication system to provide Downlink Control Information, DCI,-based Transmission Configuration Indicator, TCI, state update with flexible channel selection, the method comprising:

receiving, from a network node, a DCI, wherein a DCI format of the DCI comprises a TCI state update indication, and a TCI state update application indication indicating one or more channels or signals to which the TCI state update is to be applied by the UE; and applying the TCI state update as indicated by the TCI state update application indication, and wherein at least one of A), B), C), D), E), and F) is true:

A) the TCI state update application indication comprises a bitfield within the DCI, and wherein:

the bitfield comprises one bit;

a first codepoint of the bitfield indicates that the TCI state update should only be applied to one or more of a physical downlink shared channel, PDSCH, a physical uplink control channel, PUCCH, and a sounding reference signal, SRS, triggered by the DCI; and a second codepoint of the bitfield indicates that the TCI state update should be applied to one or more of the PDSCH, the PUCCH, and the SRS triggered by the DCI, and to a physical downlink control channel, PDCCH, and other channels or signals not triggered by the DCI; or B) the TCI state update application indication comprises a bitfield within the DCI, and wherein:

the bitfield comprises a plurality of bits;

the first codepoint of the bitfield indicates that the TCI state update should be applied only to the PDSCH, the PUCCH, or the SRS, triggered by the DCI;

the second codepoint of the bitfield indicates that the TCI state update should be applied only to the PDCCH;

a third codepoint of the bitfield indicates that the TCI state update should be applied to all downlink, DL, signals; and a fourth codepoint of the bitfield indicates that the TCI state update should be applied to all uplink, UL, signals; or C) the TCI state update application indication comprises a bitfield within the DCI, and wherein the TCI state update application indication comprises a bitfield within the DCI, and wherein a codepoint of the TCI state update indication points to two TCI states comprising a TCI state for DL channels and a TCI state for UL channels; or D) the TCI state update application indication comprises using one of a plurality of Radio Network Temporary Identifiers (RNTIs) to scramble a cyclic redundancy check (CRC) of the DCI and wherein:

a first RNTI of the plurality of RNTIs indicates that the TCI state update should be applied only to a physical downlink shared channel, PDSCH, a physical uplink control channel, PUCCH, or a sounding reference signal, SRS, triggered by the DCI;

a second RNTI of the plurality of RNTIs indicates that the TCI state update should be applied only to a control resource set, CORESET, in which the DCI is conveyed; and a third RNTI of the plurality of RNTIs indicates that the TCI state update should be applied to all downlink, DL, signals, a subset of all DL signals, all UL signals, or a subset of all UL signals; or E) wherein the TCI state update application indication comprises a Radio Resource Control, RRC, configured parameter and wherein:

the TCI state update indicated in the DCI is applied to the PUCCH, and the PUSCH, and all the DL channels, but is not applied to the SRS;

wherein the RRC configured parameter indicates to which a PUCCH resource and/or a PUCCH resource group the TCI state update indicated in the DCI is applied;

wherein the RRC configured parameter comprises a list of CORESETs, to which the TCI state update indicated in the DCI is applied;

wherein the RRC configured parameter comprises a CORESET pool index to which the TCI state update indicated in the DCI is applied;

wherein the RRC configured parameter is configured in a PDSCH Config information element, IE;

wherein the RRC configured parameter is configured per serving cell, such that all bandwidth parts, BWPs, of a configured serving cell follow a same configuration;

wherein the RRC configured parameter is configured for a list of serving cells;

wherein:

the UE is configured with a single CORESET;

a list of TCI states is activated, with each activated TCI state mapped to a codepoint; and the DCI comprises an indication from the network node signaling the codepoint to select one of the activated TCI states for use by the UE as a quasi-co-located, QCL, source for all DL and UL signals;

wherein:

the UE is configured with two control resource sets, CORESETs, each with a different CORESETPoolIndex;

the DCI comprises a codepoint for the TCI state update indication transmitted in a CORESET associated with a first CORESETPoolIndex; and the DCI updates a TCI state of the CORESET and all DL and UL signals later triggered by a subsequent DCI transmitted in the CORESET; or F) wherein the TCI state update indicated in the DCI is applied to different signals and/or different channels corresponding to different DCI formats of the DCI and wherein:

a TCI state update in DCI format 0_1 is applied to a sounding reference signal, SRS, and a physical uplink shared channel, PUSCH; and a TCI state update in DCI format 1_1 is applied to the PDSCH, and the PDCCH.

* * * * *